United States Patent
Grannan

(10) Patent No.: US 8,868,463 B2
(45) Date of Patent: Oct. 21, 2014

(54) SYSTEM AND METHOD OF MANAGING DIGITAL RIGHTS

(75) Inventor: Michael Grannan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1242 days.

(21) Appl. No.: 11/811,147

(22) Filed: Jun. 8, 2007

(65) Prior Publication Data

US 2008/0306871 A1    Dec. 11, 2008

(51) Int. Cl.
| | |
|---|---|
| *G06F 21/10* | (2013.01) |
| *H04N 21/239* | (2011.01) |
| *H04N 21/482* | (2011.01) |
| *H04N 21/472* | (2011.01) |
| *H04N 7/173* | (2011.01) |
| *H04N 21/835* | (2011.01) |
| *H04N 21/2747* | (2011.01) |
| *H04N 5/775* | (2006.01) |

(52) U.S. Cl.
CPC .... *H04N 7/17336* (2013.01); *G06F 2221/0766* (2013.01); *H04N 21/2393* (2013.01); *G06F 21/10* (2013.01); *H04N 21/4821* (2013.01); *H04N 21/47202* (2013.01); *H04N 21/835* (2013.01); *H04N 21/2747* (2013.01); *H04N 5/775* (2013.01)
USPC ............ 705/51; 705/50; 705/52; 705/59; 725/105; 725/110; 725/115; 725/117; 725/143; 725/145; 725/147; 725/151; 709/213; 709/217; 709/218; 709/219; 709/223; 709/230; 709/232

(58) Field of Classification Search
USPC ........ 709/203, 217–219, 213, 223, 230, 232; 725/105, 110, 115, 117, 143, 145, 147, 725/151; 705/50–52, 59
See application file for complete search history.

(56) References Cited

U.S. PATENT DOCUMENTS

| | | | | |
|---|---|---|---|---|
| 5,210,829 | A * | 5/1993 | Bitner | 710/57 |
| 5,261,072 | A * | 11/1993 | Siegel | 710/22 |
| 5,400,402 | A * | 3/1995 | Garfinkle | 380/231 |
| 5,511,208 | A * | 4/1996 | Boyles et al. | 709/223 |
| 5,734,719 | A * | 3/1998 | Tsevdos et al. | 700/234 |
| 5,878,429 | A * | 3/1999 | Morris et al. | 1/1 |
| 5,907,837 | A * | 5/1999 | Ferrel et al. | 1/1 |
| 5,909,638 | A * | 6/1999 | Allen | 725/146 |
| 5,933,498 | A * | 8/1999 | Schneck et al. | 705/54 |
| 5,956,716 | A * | 9/1999 | Kenner et al. | 1/1 |
| 6,009,099 | A * | 12/1999 | Lewis et al. | 370/397 |
| 6,704,489 | B1 * | 3/2004 | Kurauchi et al. | 386/248 |
| 6,836,454 | B2 * | 12/2004 | Sasaki et al. | 369/47.39 |
| 6,859,790 | B1 * | 2/2005 | Nonaka et al. | 705/51 |
| 7,024,466 | B2 * | 4/2006 | Outten et al. | 709/219 |
| 7,239,066 | B2 * | 7/2007 | Ott et al. | 310/339 |
| 7,293,066 | B1 * | 11/2007 | Day | 709/213 |

(Continued)

*Primary Examiner* — Mamon Obeid
(74) *Attorney, Agent, or Firm* — Toler Law Group, PC

(57) ABSTRACT

A method of managing digital rights is disclosed that includes recording media content at one or more servers supporting a multimedia content distribution service. The one or more servers are configured to transmit multimedia data to multiple customer premises equipment (CPE) devices. The method further includes determining recorded media content at the one or more servers that is associated with a content source and providing a graphical user interface (GUI) accessible to a content manager at the content source to manage digital rights. The GUI includes a list of the recorded media content and at least one selectable element associated with each item of the list accessible to select media content and to configure digital rights associated with the selected media content.

17 Claims, 11 Drawing Sheets

(56) References Cited

U.S. PATENT DOCUMENTS

| | | | |
|---|---|---|---|
| 7,716,509 B2* | 5/2010 | Inagaki | 713/400 |
| 7,954,128 B2* | 5/2011 | Maynard et al. | 725/88 |
| 7,984,477 B2* | 7/2011 | Nadarajah et al. | 725/149 |
| 8,028,322 B2* | 9/2011 | Riedl et al. | 725/134 |
| 8,079,053 B2* | 12/2011 | Yampanis et al. | 725/93 |
| 8,191,097 B1* | 5/2012 | Armstrong et al. | 725/91 |
| 8,214,868 B2* | 7/2012 | Hamilton et al. | 725/94 |
| 8,285,818 B2* | 10/2012 | Grannan et al. | 709/219 |
| 8,296,816 B2* | 10/2012 | Grannan et al. | 725/120 |
| 8,584,191 B2* | 11/2013 | Grannan et al. | 725/120 |
| 8,719,441 B2* | 5/2014 | Grannan et al. | 709/231 |
| 2001/0042045 A1* | 11/2001 | Howard et al. | 705/51 |
| 2002/0026478 A1* | 2/2002 | Rodgers et al. | 709/205 |
| 2002/0026645 A1* | 2/2002 | Son et al. | 725/117 |
| 2002/0105872 A1* | 8/2002 | Sasaki et al. | 369/47.39 |
| 2003/0236996 A1* | 12/2003 | Himmel et al. | 713/200 |
| 2006/0282696 A1* | 12/2006 | Inagaki | 713/600 |
| 2006/0294561 A1* | 12/2006 | Grannan et al. | 725/101 |
| 2007/0008834 A1* | 1/2007 | Yoneda et al. | 369/24.01 |
| 2007/0050818 A1* | 3/2007 | Berger et al. | 725/58 |
| 2007/0250635 A1* | 10/2007 | Hamilton et al. | 709/231 |
| 2007/0277205 A1* | 11/2007 | Grannan | 725/80 |
| 2008/0107392 A1* | 5/2008 | Grannan et al. | 386/83 |
| 2008/0229356 A1* | 9/2008 | Nadarajah et al. | 725/39 |
| 2008/0306871 A1* | 12/2008 | Grannan | 705/51 |
| 2008/0306962 A1* | 12/2008 | Grannan et al. | 707/10 |
| 2009/0271209 A1* | 10/2009 | Krishnamurthy et al. | 705/1 |
| 2010/0313229 A1* | 12/2010 | Martini | 725/105 |
| 2012/0272273 A1* | 10/2012 | Grannan et al. | 725/50 |
| 2012/0331170 A1* | 12/2012 | Grannan et al. | 709/231 |
| 2013/0019322 A1* | 1/2013 | Nishimura | 726/29 |
| 2013/0246564 A1* | 9/2013 | Lee et al. | 709/217 |

* cited by examiner

SYSTEM AND METHOD OF MANAGING DIGITAL RIGHTS

FIELD OF THE DISCLOSURE

The present disclosure is generally related to systems and methods of managing digital rights.

BACKGROUND

Network-based digital video recorders (DVRs) may be accessible via set-top box devices or other devices at a customer premises to schedule recording of media content, such as television programs, at a provider network. The provider network can record the requested media content and make such recorded media content accessible to one or more requesting subscribers. Storing the media content for access by subscribers at a network DVR may utilize a considerable amount data storage.

In general, the recorded media content at the provider network is not accessible by the original source of the media content, such as the content source, the copyright owner, the broadcast source, or any combination thereof. Despite the potential existence of multiple DVR recordings of the media content at the provider network, the original source of the media content does not have access to such recordings. Hence, there is a need for an improved method and system of managing digital rights.

DETAILED DESCRIPTION OF THE DRAWINGS

Figure 1:
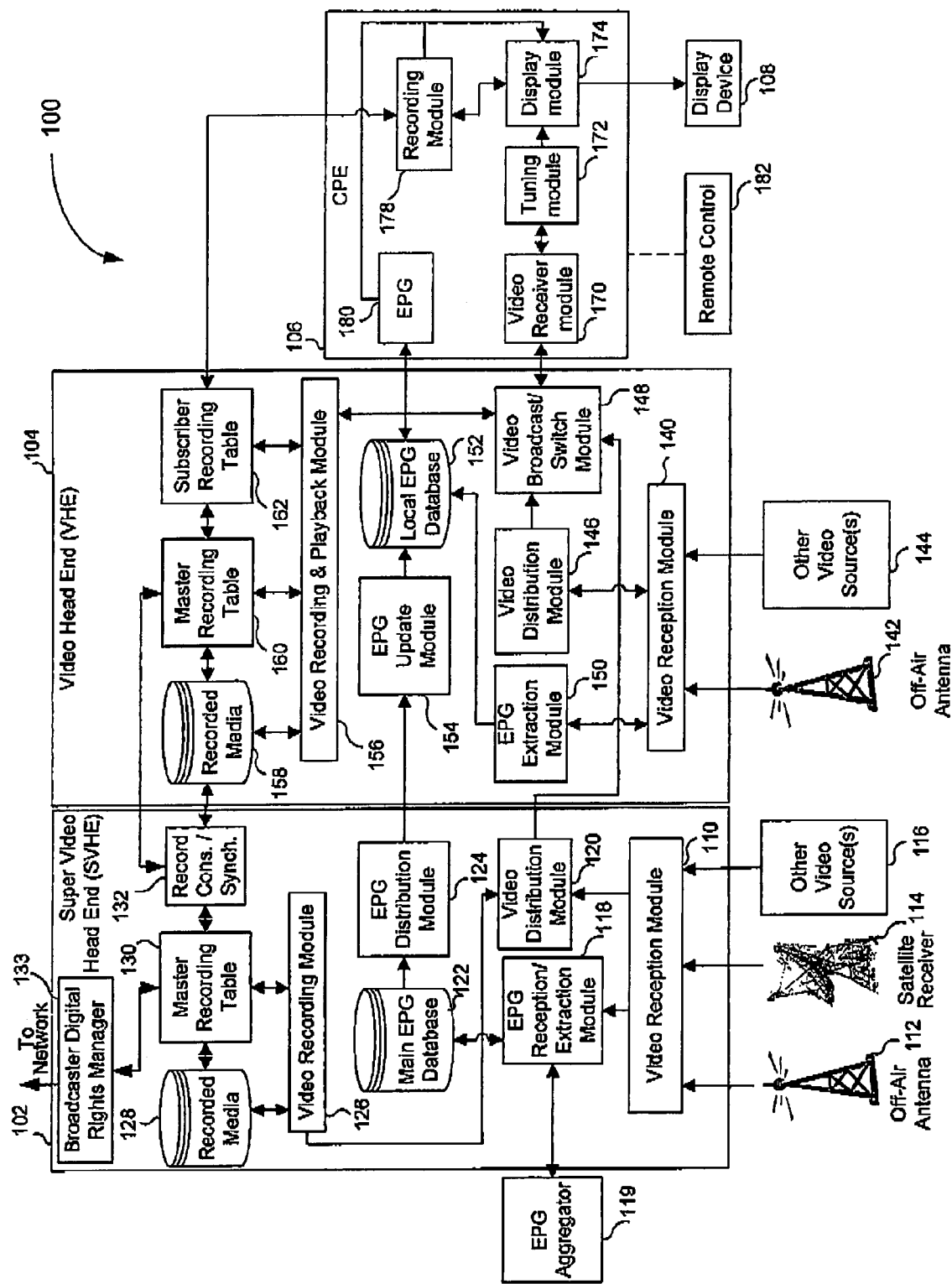
FIG. 1 is a block diagram of a particular illustrative embodiment of a system to manage digital rights.

In a particular embodiment, a method of managing digital rights is disclosed that includes recording media content at one or more servers supporting a multimedia content distribution service. The one or more servers are configured to transmit multimedia data to multiple customer premises equipment (CPE) devices. The method further includes determining recorded media content at the one or more servers that is associated with a content source and providing a graphical user interface (GUI) accessible to a content manager at the content source to manage digital rights. The GUI includes a list of the recorded media content and at least one selectable element associated with each item of the list accessible to select media content and to configure digital rights associated with the selected media content.

In another particular embodiment, a system is disclosed that includes processing logic and memory accessible to the processing logic supporting a multimedia content distribution service configured to transmit multimedia data to multiple customer premises equipment (CPE) devices. The memory includes instructions executable by the processing logic to record media content at the memory and to determine recorded media content at the memory that is associated with a content source. The memory also includes instructions executable by the processing logic to provide a graphical user interface (GUI) accessible to a content manager at the content source to manage digital rights. The GUI includes a list of the recorded media content and at least one selectable element associated with each item of the list accessible to select media content and to configure digital rights associated with the selected media content.

In still another particular embodiment, a processor-readable medium is provided that includes instructions executable by a processor to manage digital rights. The instructions include instructions to record media content at one or more servers supporting a multimedia content distribution service. The one or more servers are configured to transmit multimedia data to multiple customer premises equipment (CPE) devices. The instructions further includes instructions to determine recorded media content associated with a content source at the one or more servers and instructions to provide a graphical user interface (GUI) accessible to a content manager at the content source to manage digital rights. The GUI includes a list of the recorded media content and at least one selectable element associated with each item of the list accessible to select media content and to configure digital rights associated with the selected media content.

In yet another embodiment, a graphical user interface (GUI) is disclosed that includes a list of media content items associated with a content source stored at one or more servers supporting a multimedia content distribution service. The one or more servers are configured to transmit multimedia data to multiple customer premises equipment (CPE) devices. The GUI further includes a first selectable element to configure one or more offer profiles to define access rights to media content and a plurality of selectable elements. Each element of the plurality of selectable elements is associated with a respective media content item from the list of media content items to associate at least one offer profile of the one or more offer profiles with the respective media content item.

FIG. 1 is a block diagram of a particular illustrative embodiment of a system 100 to manage digital rights. The system 100 can include a super video head end (SVHE) 102 that provides multimedia content to another video head end (VHE) 104, such as a regional or metropolitan VHE. The VHE 104 may provide the multimedia content to a customer premises equipment (CPE) device 106 for display at a display device 108.

The SVHE 102 may include a video reception module 110 adapted to receive multimedia signals from an off-air antenna 112, a satellite receiver 114, other video source(s) 116, or any combination thereof. The multimedia signals may include video signals, audio signals, text data, or any combination thereof. The multimedia signals may be analog signals or digital data signals.

The video reception module 110 may be coupled to an electronic program guide (EPG) reception module 118. The EPG reception module 118 can receive EPG data from an EPG aggregator 119. The EPG reception module 118 can communicate with a main EPG database 122 to store extracted data related to the received EPG data. The main EPG database 122 may include program data related to the multimedia signals, such as a program title, a program start time, a program end time, a program rating, a program description, or any combination thereof. The main EPG database 122 may be coupled to an EPG distribution module 124 for distributing the program data to the VHE 104. The video reception module 110 may also be coupled to a video distribution module 120 for distributing the multimedia signals to the VHE 104.

In a particular embodiment, the SVHE 102 may include a video recording module 126. The video recording module 126 may be coupled to the video distribution module 120 to allow stored programs to be distributed to the VHE 104. The video recording module 126 may also be coupled to a recorded media database 128 and a master recording table 130. The master recording table 130 may be coupled to a recording consolidation module 132. In a particular embodiment, the video recording module 126 may be a network-based DVR. The SVHE 102 can also include a broadcaster digital rights manager 133.

The VHE 104 may comprise a video reception module 140 adapted to receive multimedia signals from an off-air antenna 142 and any other video source(s) 144. The multimedia signals may include video signals, audio signals, or combined video and audio signals. The multimedia signals may be analog signals or digital data signals. The VHE 104 may be configured to allow content distribution to multiple CPE devices in a specific region. The specific region may be a metropolitan area, a country, or any other geographic region.

The video reception module 140 may be coupled to an electronic program guide (EPG) extraction module 150. The EPG extraction module 150 may be coupled to a local EPG database 152. The local EPG database 152 may include program data related to the multimedia signals. The program data may include a program title, a program start time, a program end time, a program rating, a program description, or any combination thereof. The local EPG database 152 may be coupled to an EPG update module 154 for receiving program data from the EPG distribution module 124. The video reception module 140 may also be coupled to a video distribution module 146. The video distribution module 146 may be coupled to a video broadcast module 148 for distributing the multimedia signals to the CPE device 106. The video broadcast module 148 may be coupled to the video distribution module 120 of the SVHE 102.

In a particular embodiment, the VHE 104 may include a video recording and playback module 156. The VHE 104 may also include a recorded media database 158, a master recording table 160, and a subscriber recording table 162, all of which may communicate with the video recording and playback module 156. The recorded media database 158 may communicate with the recording consolidation module 132 of the SVHE 102. The video recording and playback module 156 may be coupled to the video broadcast module 148, which is adapted to transmit media content to one or more CPE devices, such as the CPE device 106, via an access network, such as an Internet Protocol Television (IPTV) access network.

The CPE device 106 may include a video receiver module 170, a tuning module 172, a display module 174, a recording module 178, and an EPG module 180. The video receiver module 170 may be coupled to the video broadcast module 148 of the VHE 104. The recording module 178 may communicate with the subscriber recording table 162. The EPG module 180 may communicate with the local EPG database 152 of the VHE 104. The CPE device 106 may be adapted to communicate with a remote control 182.

The CPE device 106 may be coupled to or integrated with a display device 108, such as a television monitor, via the display module 174. The CPE device 106 may include a set-top box device; a video gaming device or a console that is adapted to receive television content; an interface device within the display device 108, such as a cable card; a personal computer or other computing devices that is adapted to emulate set-top box device functionalities; any other device adapted to receive video content and transmit data to a server via the access network 106; or any combination thereof.

In a particular illustrative embodiment, the video reception module 110 receives at least one multimedia signal from at least one of the off-air antenna 112, the satellite receiver 114, and the other video source(s) 116. The EPG reception module 118 may extract program data from the multimedia signal and provide it to the main EPG database 122. The EPG distribution module 124 may then send the program data from the main EPG database 122 to the EPG update module 154 to update the local EPG database 152. The local EPG database 152 may also include program data from the EPG extraction module 150 that is related to other multimedia signals received via the video reception module 140.

Further, the video distribution module 120 may receive the multimedia signal from the video reception module 110 and send the multimedia signal to the video broadcast module 148. In a particular embodiment, the video distribution module 120 may receive a multimedia signal related to recorded multimedia content from the video recording module 126 and provide the multimedia signal related to the recorded multimedia content to the video broadcast module 148. In a particular embodiment, the video broadcast module 148 may also receive a multimedia signal from the video distribution module 146. The multimedia signal may be received via the video reception module 140 from the off-air antenna 142 or the other video source(s) 144. In another particular embodiment, the video broadcast module 148 may receive a multimedia signal related to recorded multimedia content from the video recording and playback module 156. In yet another particular embodiment, the video broadcast module 148 may receive a multimedia signal related to recorded multimedia content from the video recording module 126 and provide the multimedia signal related to the recorded multimedia content to the CPE device 106. The video broadcast module 148 may provide one of or any combination of the multimedia signals to the CPE device 106.

The CPE device 106 may receive a multimedia signal from the video broadcast module 148 at the video receiver module 170. The tuning module 172 may select a specific channel or content from the multimedia signal and provide that specific channel or content to the display module 174. The specific channel or content may be selected in response to a user input, such as a selection of an element of a graphical user interface via the remote control 182. The electronic program guide module 180 may receive program data from the local EPG database 152 and provide the program data to the graphical user interface. The display module 174 may be adapted to provide the specific channel or content and the graphical user interface to the display device 108.

In a particular embodiment, the CPE device 106 may receive a request to record specific content at the recording module 178. The request may be initiated by a selection of an element of a graphical user interface via the remote control 182. The recording module 178 may determine whether the specific content should be recorded at the CPE device 106 or at another location, such as the VHE 104. The recording module 178 may determine where to store the specific content based on a storage capacity of the CPE device 106; an available bandwidth of a connection from the VHE 104 to the CPE device 106; an ability of the specific content to be recorded at the VHE 104 or the SVHE 102; or any combination thereof. In a particular embodiment, the specific content may always be recorded at the VHE 104. In another particular embodiment, a portion of the particular content may be stored at the VHE 104 and a portion may be stored at the CPE device 106.

In another particular embodiment, the VHE 104 may receive a request from the CPE device 106 to record multimedia content. The subscriber recording table 162 may receive an indication from the recording module 178 to record the multimedia content, and an entry related to the multimedia content may be added at the subscriber recording table 162. The subscriber recording table 162 may associate the request to record the multimedia content with a subscriber account corresponding to the CPE device 106. The subscriber recording table 162 may also indicate other multimedia content that is available to the CPE device 106 via the VHE 104.

When an entry to record multimedia content is added to the subscriber recording table 162, the master recording table 160 may be updated to indicate a subscriber has requested the specific multimedia content to be recorded. The master recording table 160 may store data related to a number of subscribers that have requested the multimedia content to be recorded, and this number may be incremented when an entry to the subscriber recording table 162 is made or when the VHE 104 receives a request to record the multimedia content.

The video recording and playback module 156 may record the multimedia content at a storage location associated with the VHE 104. The storage location may include a data storage device, such as a solid state data storage device, a disk drive, an array of disk drives, or any combination thereof. The recorded media database 158 may be updated to indicate that the multimedia content has been stored. The recorded media database 158 may include a pointer to a location of the stored multimedia content. The video recording and playback module 156 may provide the multimedia content to the video broadcast module 148.

In a particular embodiment, the SVHE 102 may store the multimedia content based on information from the VHE 104 or a combination of multiple VHEs. The information may include a number of requests to record the multimedia content, a storage capacity of the VHE 104, an ability of the VHE 104 to store the multimedia content, an ability of the SVHE 102 to store the multimedia content, or any combination thereof.

In a particular embodiment, the recording consolidation module 132 may receive the number of requests to record the multimedia content from the master recording table 160. The recording consolidation module 132 may determine whether the SVHE 102 should store the multimedia content. In a particular embodiment, when the number of requests to record the multimedia content equals or exceeds a threshold, the SVHE 102 may store the multimedia content. Alternatively, the VHE 104 may store the multimedia content in an instance where the SVHE 104 does not have the ability to store the multimedia content, such as when the VHE 104 receives the multimedia content but the SVHE 102 does not receive the multimedia content.

After the recording consolidation module 132 determines that the SVHE 102 is to store the multimedia content, an entry is added to the master recording table 130 to indicate that the SVHE 102 is to store the multimedia content. The video recording module 126 then schedules and records the multimedia content based on the information in the master recording table 130. The video recording module 126 may update the recorded media database 128 with a pointer indicating a location of the stored media content.

In a particular illustrative embodiment, the recording consolidation module 132 may update the master recording table 160 at the VHE 104 to indicate that the SVHE 102 is to store the multimedia content. The recording consolidation module 132 may also update a pointer in the recorded media database 158 to indicate the location of the multimedia content at the SVHE 102.

In a particular embodiment, the broadcaster digital rights manager 133 can generate a graphical user interface (GUI) that includes a list of multimedia content identified in the master recording table 130 that is associated with a particular content source, such as a particular broadcaster, a Copyright owner, other content owner, or any combination thereof. The GUI may also include user selectable elements to configure one or more media content offer profiles and to associate selected offer profiles with selected media content to configure digital access rights. The broadcaster digital rights manager 133 can provide the GUI to an authorized user at the particular content source via a network. The GUI can be accessed by the authorized user to provision digital rights related to already recorded media content at the network DVR (i.e., SVHE 102 and VHE 104). In particular, the GUI may be accessed to configure offer profiles for already recorded media content so that such media content may be made available for purchase (i.e. Video on Demand) to other subscribers via the SVHE 102 and VHE 104, to Internet users via a public network (for purchase), to Internet users via a public network, or any combination thereof. The broadcaster digital rights manager 133 may be made available to the particular broadcaster, Copyright owner, or other content owner through a Virtual Private Network connection or other secure mechanism, and accessed via a standard web interface or custom application.

Figure 2:
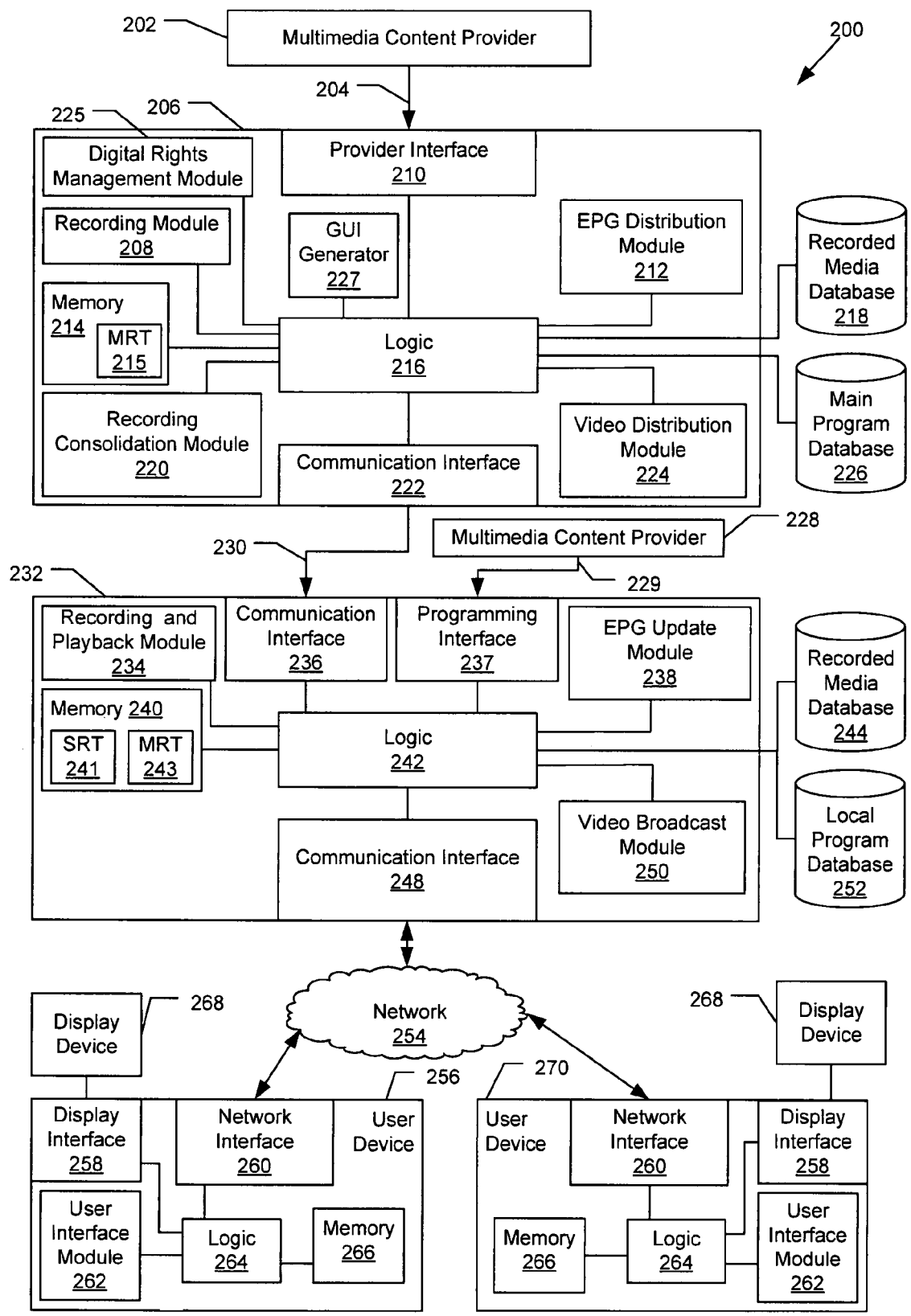
FIG. 2 is a block diagram of a second particular illustrative embodiment of a system to manage digital rights.

FIG. 2 is a block diagram of a second particular illustrative embodiment of a system 200 to manage digital rights. The system 200 includes a first multimedia content provider 202 that communicates via a first communication channel 204 with a super video head end (SVHE) server 206. The SVHE server 206 communicates with a video head end (VHE) server 232 via a communication channel 230. The system 200 also includes a second multimedia content provider 228 that communicates via a second communication channel 229 with the VHE server 232. The VHE server 232 is in communication with a plurality of subscriber devices 256 and 270 via an access network 254.

The SVHE server 206 can include a recording module 208, a programming interface 210, an EPG distribution module 212, a memory 214, logic 216, a recording consolidation module 220, a communication interface 222, a video distribution module 224, a digital rights management module 225, and a GUI generator 227. In an illustrative embodiment, the modules may be implemented as hardware, software, or any combination thereof. The memory 214 can include a master recording table 215. The SVHE server 206 can also include or communicate with a recorded media database 218 and a main program database 226. In one embodiment, the logic 216 may include a processor. The digital rights management module 225 and the GUI generator 227 may be executable by the logic 216 to provide a graphical user interface to provision or manage digital rights related to media content stored via a network DVR function.

The VHE server 232 can include a recording and playback module 234, a communication interface 236, a programming interface 237, an EPG update module 238, a memory 240, logic 242, a communication interface 248, and a video broadcast module 250. In a particular illustrative embodiment, the VHE server 232 can include a digital rights management module and a GUI generator (similar to the digital rights management module 225 and GUI generator 227). In an illustrative embodiment, the modules may be implemented in hardware, software, or any combination thereof. The memory 240 can include a subscriber recording table 241 and a master recording table 243. The SVHE server 206 can also include or communicates with a recorded media database 244 and a local program database 252.

The subscriber devices 256 and 270 include network interfaces 260, user interface modules 262, logic 264, memories 266, and display interfaces 258. The subscriber devices 256 and 270 communicate with the VHE 232 via the network 254 and the network interfaces 260. The subscriber devices 256 and 270 can provide media content to display devices 268 via the display interfaces 258.

In a particular embodiment, the programming interface 210 may receive multimedia programming from the multimedia content provider 202 via the communication channel 204. The communication channel 204 may include satellite signals, fiber-optic signals, air-wave broadcast signals, other radio frequency signals, or any combination thereof. The particular format of the television programming or the protocol used to send the television programming may vary in different embodiments. The video distribution module 224 may provide the multimedia programming to the VHE server 232 via the communication interface 222. In addition, the EPG distribution module 212 may provide program data from the main program database 226 to the VHE server 232 via the communication interface 222.

In a particular embodiment, the communication interface 236 may receive the multimedia programming from SVHE server 206. In addition, the programming interface 237 may receive multimedia programming from the multimedia content provider 228 via the communication channel 229. The communication channel 229 may include satellite signals, fiber-optic signals, air-wave broadcast signals, other radio frequency signals, or any combination thereof. The particular format of the television programming or the protocol used to send the television programming may vary in different embodiments. The video broadcast module 250 may provide the multimedia programming to the subscriber devices 256 and 270 via the communication interface 248. In addition, the EPG update module 238 may receive the program data from the EPG distribution module 212 and may store the program data in the local program database 252. The program data may be provided to the subscriber devices 256 and 270 via the communication interface 248.

The subscriber devices 256 and 270 may receive the multimedia programming and the program data via the network interface 260. The logic 264 may provide the multimedia programming to the display device 268 via the display interface 258. The user interface module 262 may provide a graphical user interface program stored in the memory 266 to the display device 268. The graphical user interface program may include selectable elements that allow a user to initiate a recording of multimedia programming. The user interface module 262 may receive an indication of a user selection of a selectable element of the graphical user interface to record the multimedia programming. The logic 264 may transmit the user selection to the VHE server 232 via the access network 254.

In a particular embodiment, the communication interface 248 may receive control commands from the subscriber devices 256 or 270 via the network 254. For example, the control commands may include a control command to record multimedia programming based on the user selection received from the user devices 256 or 270. The recording and playback module 234 may initiate a recording of the multimedia programming based on the user selection. In another example, the control commands may include a playback request requesting that a program in the recorded media database 244 be transmitted to the subscriber device 256 or 270. In a particular embodiment, the logic module 242 may invoke the recording and playback module 234 after receiving a request to playback a recorded multimedia program from the subscriber device 256 or 270. The control commands may include a request to delete an entry from the subscriber recording table 241.

In a particular embodiment, an entry may be added or updated in the subscriber recording table 241 to indicate a specific subscriber account or subscriber device has requested a recording of the multimedia programming. The recording and/or availability of the multimedia programming may be managed by various digital rights management schemes.

In another particular embodiment, an entry may be added or updated in the master recording table 243 to indicate that the multimedia programming is to be recorded. In a particular embodiment, a number of subscriber devices or a number of subscribers requesting recording of the multimedia programming may be incremented. The recording and playback module 234 may record the multimedia programming to the recorded media database 244 as one or more program data files. A pointer may be updated in the master recording table 243 to indicate the location of the recorded multimedia programming in the recorded media database 244.

A user may send a control command requesting playback of a recorded multimedia program via a user interface presented via the display device 268. The user interface may be generated by the user interface module 262. The user interface may be generated based on program data stored in the subscriber recording table 241. For example, the user interface may include a menu of recorded multimedia programs associated with the subscriber device based on data stored in the subscriber recording table 241.

The recording and playback module 234 may access the recorded multimedia programming and send the recorded multimedia programming data to the subscriber device 256 or 270 via the network 254. In a particular embodiment, the recording and playback module 234 may stream the multimedia programming data to the subscriber device 256 or 270. In another particular embodiment, the recording and playback module 234 may allow the user device 256 or 270 to store the recorded multimedia programming in the memory 266.

In another particular embodiment, the SVHE server 206 may record the multimedia programming. The recording and consolidation module 220 may receive the number of subscriber devices requesting recording of the multimedia programming from the master recording table 243 via the communication interface 222. In a particular embodiment, the recording consolidation module 220 may periodically request the number from the master recording table 243. In another particular embodiment, the logic 242 may compare the number to a threshold and notify the recording and consolidation module 220 when the number is greater than the threshold.

In another particular embodiment, the recording and consolidation module 220 may record the multimedia programming when the number of subscriber devices requesting recording of the multimedia programming is greater than a threshold. In a particular embodiment, the recording and consolidation module 220 may receive data from multiple VHE servers indicating a number of subscriber devices requesting recording of the multimedia programming at a respective VHE server. The recording and consolidation module 220 may aggregate the data from the multiple VHE servers to determine when the SVHE server 206 should record the multimedia programming. For example, the SVHE server 206 may record the multimedia programming when the aggregated data includes a number of requests that is greater than a threshold.

The master recording table 215 may be updated to indicate the SVHE server 206 is responsible for recording the multimedia programming. Further, the master recording table 215 may be updated to indicate the location of the recorded multimedia programming in the recorded media database 218. The master recording table 243 may also be updated to indicate the VHE server 232 is not responsible for recording the multimedia programming. The master recording table 243 may also be updated to indicate the location of the recorded multimedia programming in the recorded media database 218.

In a particular embodiment, the SVHE server 206 and/or the VHE server 232 may record multimedia programming without the multimedia programming being requested by the subscriber devices 256 or 270. The multimedia programming may be recorded based on popularity of the program or a likelihood that the multimedia programming will be requested by the subscriber devices 256 or 270. In a particular embodiment, at least one of the SVHE server 206 and the VHE server 232 may implement a digital rights management mechanism. In a particular embodiment, the digital rights management mechanism may allow a subscriber device to only have access to multimedia programs that were requested to be recorded prior to a start of the multimedia program, within a time frame from the beginning of the multimedia program, or prior to an end of the multimedia program.

In another particular embodiment, the digital rights management mechanism may allow a subscriber device to have access to the multimedia programming for a fee, such as a pay-per-view system or a video-on-demand system. In a particular embodiment, a content provider may determine whether the multimedia programming may be available for viewing when a user device did not request to record the multimedia programming at the VHE 232 prior to a time period, such as a start of the multimedia programming. In another particular embodiment, a user device may be permitted to receive all of a requested program when a request to record the multimedia programming at the VHE 232 was not received until after a start of the requested program. In another particular embodiment, a user that originally recorded the content using his network DVR may be permitted to purchase the content for consumption on another device such as a cellular telephone or other portable device.

The SVHE server 206 and the VHE 232 may each comprise one or more servers or other devices capable of performing the described functions. In a particular embodiment, the SVHE server 206 and the VHE 232 are located geographically remote from each other.

In a particular embodiment, after media content is stored at the VHE 232 or the SVHE 206 and after the master recording table 215 is updated, the logic 216 may execute instructions associated with the GUI generator 227 to generate a GUI that includes a list of media content related to the multimedia content provider 202 and includes selectable indicators, where at least one selectable indicator is associated with each item in the list. The logic 216 can execute the digital rights management module 225 to provide the GUI to the multimedia content provider 202 via the provider interface 210. The SVHE 206 can receive data related to selected media content from a user at the multimedia content provider 202 to manage digital rights for access to media content in the list. Thus, the digital rights management module 225 and the GUI generator 227 can be accessed by the multimedia content provider 202 to take advantage of media content stored by a DVR function at the SVHE 206 or the VHE 232, making such content accessible for further distribution as video on demand-type media content.

Figure 3:
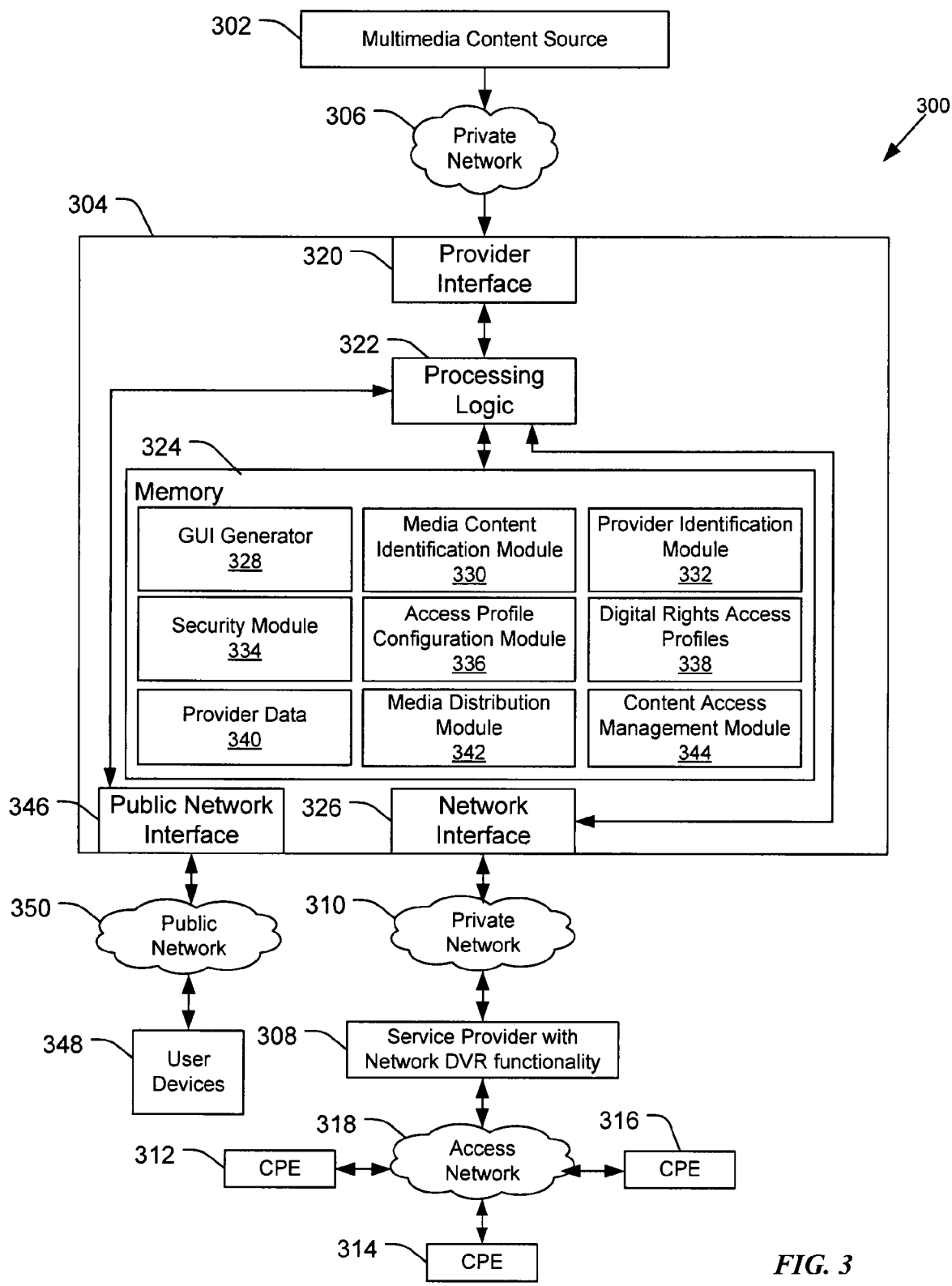
FIG. 3 is a block diagram of a third particular illustrative embodiment of a system to manage digital rights.

FIG. 3 is a block diagram of a third particular illustrative embodiment of a system 300 to manage digital rights. The system 300 includes a multimedia content distribution service or system 304 that communicates with a multimedia content source 302 via a private network 306. The multimedia content distribution server 304 communicates with one or more service providers 308 with network DVR functionality. The one or more service providers 308 can communicate with customer premises equipment devices 312, 314 and 316 via an access network 318.

The multimedia content distribution service 304 includes a provider interface 320 that communicates with the private network 306. The multimedia content distribution service 304 also includes processing logic 322, a memory 324 accessible to the processing logic 322, and a network interface 326 that communicates with the private network 310. The multimedia content distribution service 304 also includes a public network interface 346 that communicates with other devices 348 via a public network 350, such as the Internet. In a particular illustrative embodiment, the multimedia content distribution service 304 can include one or more servers, and the processing logic 322 and the memory 324 may be distributed across the one or more servers. In another particular illustrative embodiment, the private network 306 and the private network 310 may be a single network.

The memory 324 can include a graphical user interface (GUI) generator 328 that is executable by the processing logic 322 to generate a GUI. The memory 324 can also include a media content identification module 330 executable by the processing logic 322 to identify stored media content at the service provider 308. The memory 324 also includes a provider identification module 332 that is executable by the processing logic 322 to determine media content that is related to a particular multimedia content source, such as the multimedia content source 302, from the stored media content. The memory 324 also includes a security module 334 executable by the processing logic 322 to control access to the multimedia content distribution service 304. The memory 324 also includes an access profile configuration module 336 that is executable by the processing logic 322 to configure access profiles related to media content, which may be stored in the digital rights access profiles area 338. The access profiles may include copying, viewing, downloading, and other access permissions related to particular media content that a user may purchase or download from the multimedia content distribution service 304. The memory 324 also includes provider data 340 related to the service provider 308 that stores particular media content. The provider data 340 can include a master recording table that identifies media content stored at the service provider 308. The memory 324 includes a media distribution module 342 and a content access management module 344 that are executable by the processing logic 322 to distribute requested media content based on the digital rights access profiles 338.

In a particular illustrative embodiment, a subscriber at the CPE device 314 select a particular television program for recording. The CPE device 314 transmits data related to the request to the service provider 308 with the network DVR functionality. The service provider 308 may receive the request to record the media content and may record the media content at a scheduled time. The service provider 308 may also notify the multimedia content distribution system 304 of the stored media content. A list of the stored media content may be maintained in the master recording table within the provider data 340.

The multimedia content distribution service 304 can receive a request from a user at the multimedia content source 302 via the private network 306. The request may include an identifier related to the multimedia content source and a password, which the multimedia content distribution service 304 can verify using the security module 334. When the user is authenticated, the multimedia content distributions service 304 can identify media content associated with the multimedia content source 302 using the media content identification module 330 to retrieve a list of stored media content associated with the multimedia content source 302. (The method of identifying media content associated with the content source 302 may include identifying the channel it was broadcast on, data sent through ATSC/PSIP tables with digital programming, information obtained from the EPG distribution module 212, or a combination thereof.) The multimedia content distribution service 304 can generate a GUI via the GUI generator 328. The GUI can include the list of stored media content and one or more user accessible elements, which may be selected to configure digital access rights for each item in the list. The multimedia content distribution service 304 can provide the GUI to the multimedia content source 302 via the private network 306. The multimedia content distribution service 304 can receive data related to the list of media content items in the GUI. The multimedia content distribution service 304 can store access profile data in the digital rights access profiles area 338 within the memory 324.

The multimedia content distribution service 304 can also generate a video on demand GUI that includes media content that is available for download on demand based on the access profile data using the GUI generator 328. The multimedia content distribution service 304 can provide the video on demand GUI to user devices 348 via the public network 350. Selected items for the list within the video on demand GUI may be purchased for download by a user via a user device 348 based on the access profiles defined by the user at the multimedia content source 302.

The multimedia content distribution service 304 is adapted to allow a multimedia content provider 302, such as a television channel, broadcaster, content producer, other content source, or any combination thereof, to configure digital access rights to media content stored at a service provider 308 with a network DVR function. The service provider 308 with the network DVR function may store such media content in response to requests from subscribers received from the subscriber's CPE device, such as the CPE devices 312, 314, and 316. The multimedia content distribution service 304 provides a vehicle for the multimedia content source 302 to resell broadcast multimedia content-as video on demand using the stored DVR content.

Figure 4:
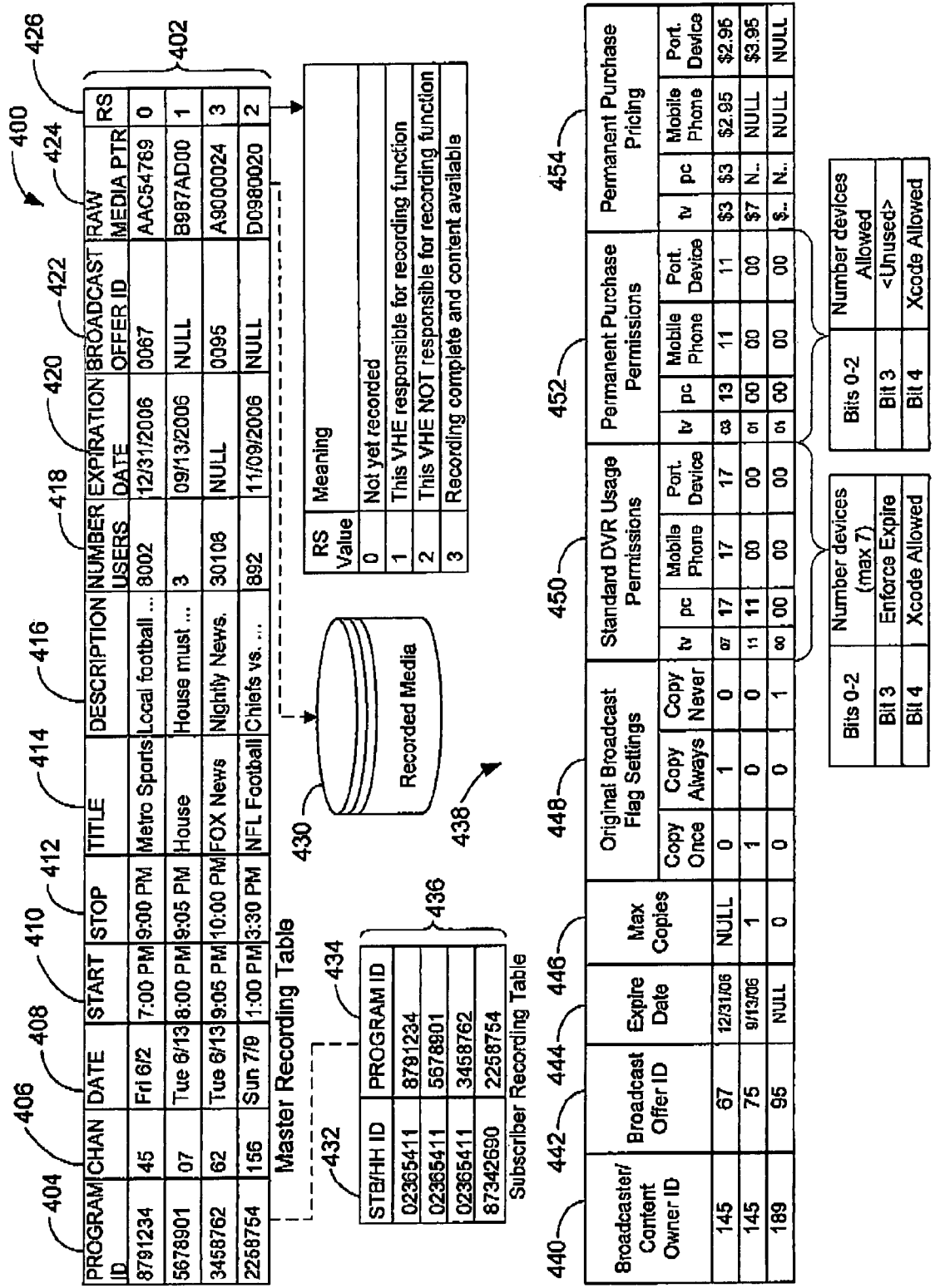
FIG. 4 is a representation of a data structure of a particular illustrative embodiment of a system to manage digital rights.

FIG. 4 depicts a representation of a data structure 400 of a particular illustrative embodiment of a system to record and access multimedia data. The data structure 400 may include a master recording table 402, a subscriber recording table 436, a recorded media storage 430, and a broadcaster digital access rights table 438.

In a particular embodiment, the subscriber recording table 436 may include a subscriber or user device identification 432 and a program identification 434. The subscriber recording table may indicate what multimedia programs may be available to a user device based on the subscriber or user device identification 432.

The master recording table 402 may indicate attributes of multimedia programs. The attributes may include a program identification 404, a channel number 406, a date 408, a start time 410, a stop time 412, a title 414, a description 416, a number of users 418, an expiration date 420, an offer identification 422, a pointer to a location of the multimedia program 424, and a status of the multimedia program 426. The offer identification 422 may identify one of multiple offers related to the multimedia program. The offers may include an offer to purchase a multimedia program for viewing, such as a pay-per-view offer or video-on-demand offer. The status may identify whether the multimedia content is not yet recorded, a video head end (VHE) is responsible for recording the multimedia program, the VHE is not responsible for recording the multimedia content, and if the multimedia content is recorded and available.

In a particular embodiment, program identification data and subscriber or user device identification data may be added to the subscriber recording table 436 based on a request from a user device, such as the CPE device 106 shown in FIG. 1 or the subscriber devices 256 and 270 shown in FIG. 2. The program identification data may indicate a multimedia program listed in the master recording table 402 based on the program identification 404. The master recording table 402 may store a number of users 418 requesting the multimedia program. The master recording table 402 may also store a pointer 424 that identifies a location of the multimedia program in the recorded media storage 430. In a particular embodiment, the pointer 424 may indicate a storage location that has been allocated to store the multimedia program.

The broadcaster digital rights table 438 may indicate digital access attributes of multimedia programs. The digital access attributes may include a broadcaster/content owner identifier 440, a broadcast offer identifier 442, expiration date data 444, and a maximum number of copies 446 allowed for particular media content. Further, the broadcaster digital rights table 438 includes attributes related to original broadcast flag settings 448, including copy once, copy always, and copy never digital flag settings. The attributes may also include standard DVR usage permissions 450, permanent (video on demand) purchase permissions 452, and permanent purchase pricing 454. The standard DVR usage permissions 450, the permanent purchase permissions 452, and the permanent purchase pricing 454 may include specific attributes related to particular devices, such as televisions, computers, mobile phones, other portable devices, or any combination thereof. Thus, the broadcaster digital rights table 438 includes data related to offer profiles. The offer profiles may be associated with programs stored in the master recording table 402. For example, the broadcaster offer identifier "67" associated with the broadcaster/content owner identifier 145 may be associated with the program identifier "8791234" in the master recording table 402.

The multimedia content distribution service allows a content owner, content source or content provider to configure digital access rights to media content stored via a DVR function. Further, the service may be utilized to selectively associate access profiles identified in the broadcaster digital rights table 438 with programs identified in the master recording table 402.

Figure 5:
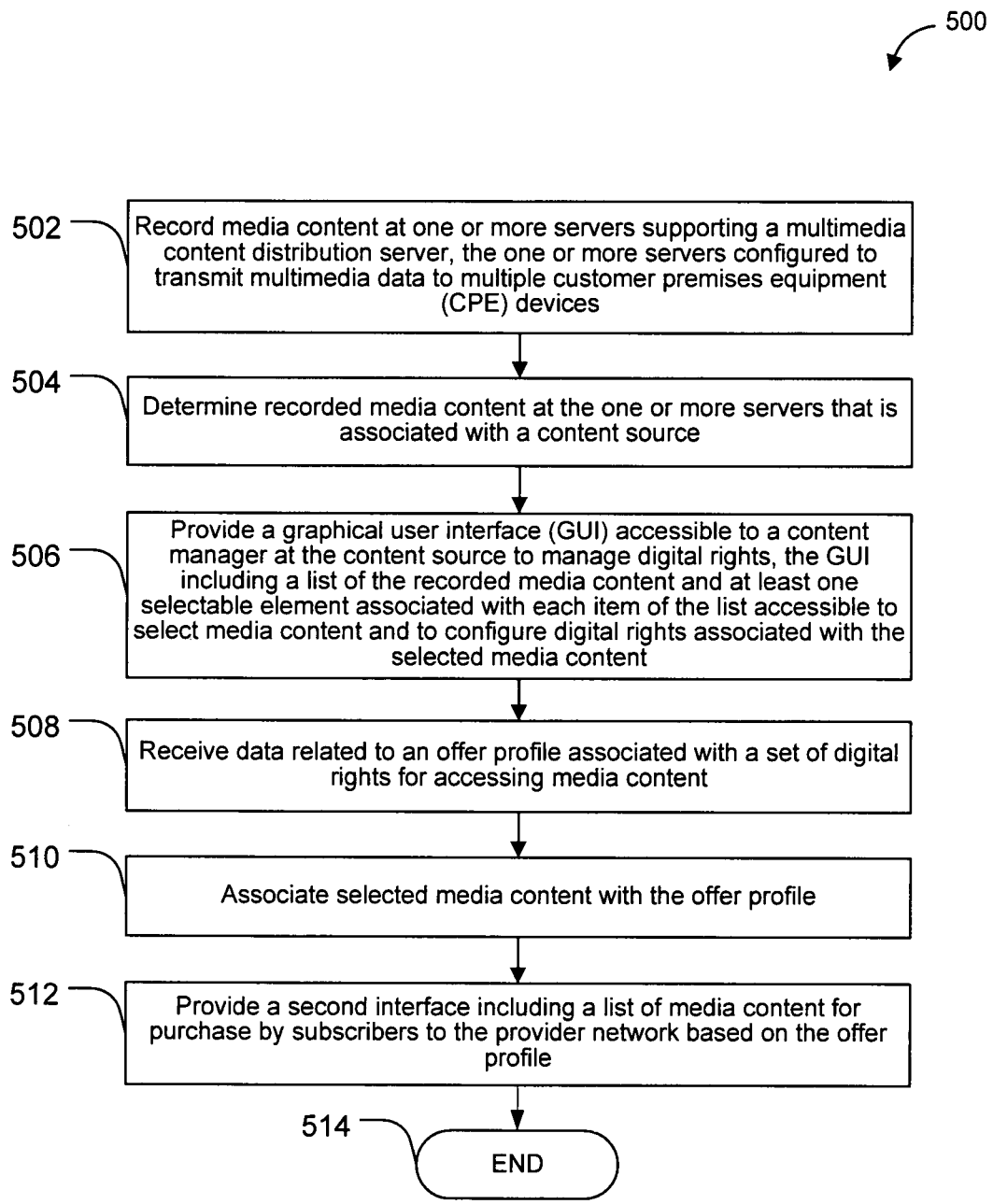
FIG. 5 is a flow chart of a particular illustrative embodiment of a method of managing digital rights.

FIG. 5 is a flow chart of a particular illustrative embodiment of a method 500 of managing digital rights. At 502, media content is recorded at one or more servers supporting a multimedia content distribution server. The one or more servers can be configured to transmit multimedia data to multiple customer premises equipment (CPE) devices. Advancing to 504, recorded media content is determined at the one or more servers that is associated with a content source. Proceeding to 506, a graphical user interface (GUI) is provided that is accessible to a content manager at the content source to manage digital rights. The GUI includes a list of the recorded media content and at least one selectable element associated with each item of the list, accessible to select media content and to configure digital rights associated with the selected media content. The digital rights can include digital video recording (DVR) usage permissions and include Video on Demand purchase permissions. The GUI also includes a selectable indicator to configure at least one offer profile, which may include an expiration date for access or download of media content.

Continuing to 508, data is received that is related to an offer profile associated with a set of digital rights for accessing media content. Moving to 510, selected media content is associated with the offer profile. Proceeding to 512, a second interface is provided that includes a list of media content for purchase by subscribers to the provider network based on the offer profile. The method terminates at 514.

In a particular illustrative embodiment, a request to record selected media content is received from a subscriber at the multimedia content distribution service. The media content is recorded at the one or more servers in response to receiving the request. In a particular illustrative embodiment, the method 500 may also include determining second recorded media content at the one or more servers that is associated with a second content source and providing a second graphical user interface (GUI) accessible to a second content manager at a second content source to manage digital rights. The second GUI includes data related to the second recorded media content and includes a selectable option to manage digital rights associated with each item of the second recorded media content.

In another particular illustrative embodiment, the method 500 may include receiving data related to the at least one offer profile, receiving data related to selected media content to associate the at least one offer profile with the selected media content, and providing an interface for purchase of the selected media content by subscribers to the provider network based on the at least one profile. The interface can be an electronic program guide accessible via the multiple CPE devices. Alternatively, the interface can be an Internet web page interface. Alternatively, the interface can be a custom application, such as one written in Java 2 Micro Edition (J2ME) for portable devices such as cellular telephones.

Figure 6:
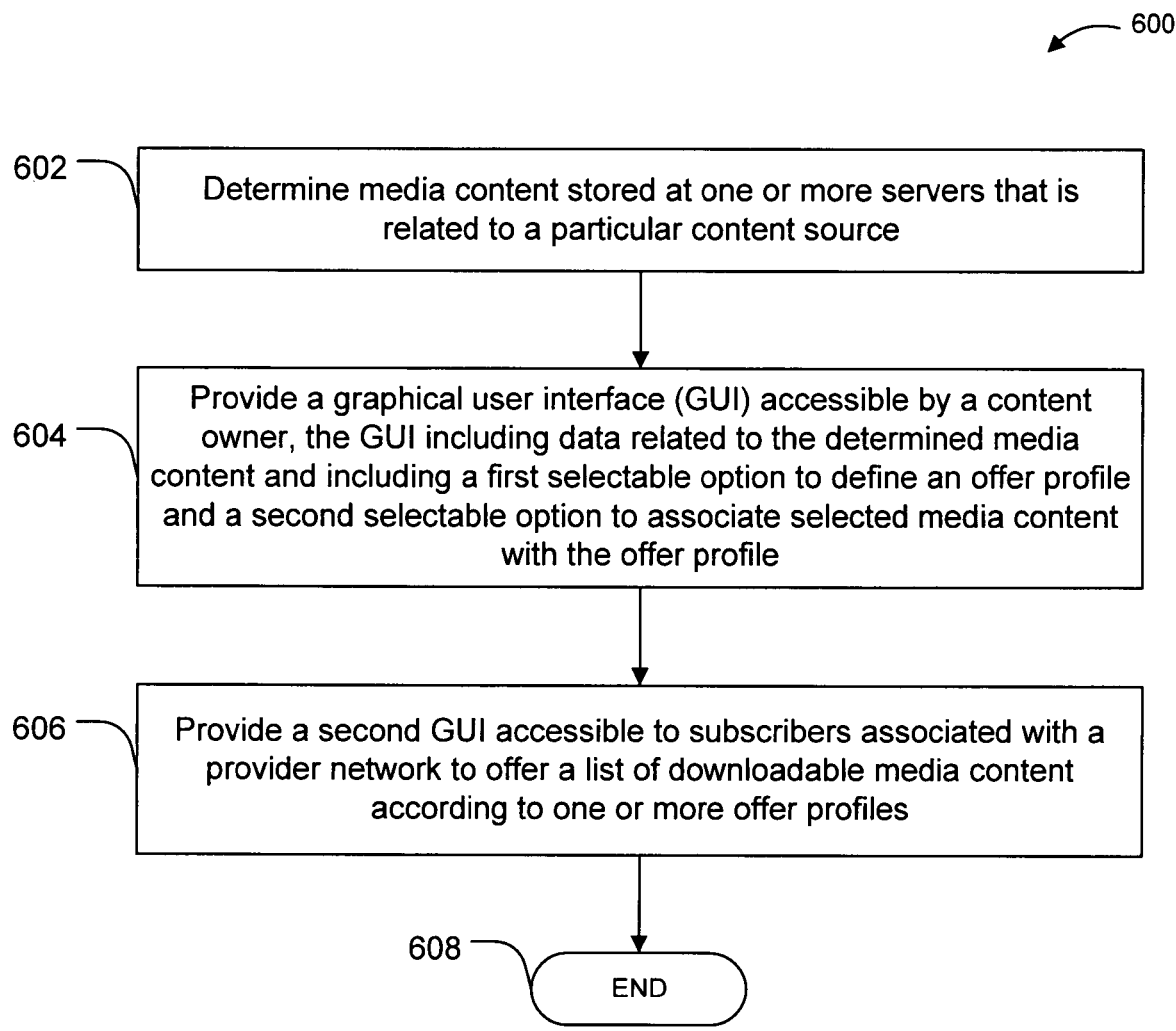
FIG. 6 is a flow chart of a second particular illustrative embodiment of a method of managing digital rights.

FIG. 6 is a flow chart of a second particular illustrative embodiment of a method 600 of managing digital rights. At 602, media content stored at one or more servers is determined that is related to a particular content source. Advancing to 604, a graphical user interface (GUI) is provided that is accessible by a content owner. The GUI includes data related to the determined media content and includes a first selectable option to define an offer profile and a second selectable option to associate media content with the offer profile. In a particular illustrative embodiment, the GUI includes a list of media content items associated with a content source that are stored at one or more servers supporting a multimedia content distribution service. The one or more servers may be configured to transmit multimedia data to multiple customer premises equipment (CPE) devices. The content source may be an entity that owns distribution rights for the media content (i.e., a licensee, a broadcaster, etc.). Alternatively, the content source may be the content owner (i.e., the Copyright owner). The GUI also includes a first selectable element to configure one or more offer profiles to define access rights to the media content and includes multiple selectable elements, where each selectable element is associated with a respective media content item from the list of media content items. The GUI may also include a list of offer profile items and multiple selectable elements associated with respective offer profile items. Each of the selectable elements is accessible by an authorized user to modify digital access rights associated with the respective offer profile item.

Continuing to 606, a second GUI is provided that is accessible to subscribers associated with a provider network to offer a list of downloadable media content according to one or more offer profiles. The method terminates at 608.

In a particular illustrative embodiment, the first GUI and the second GUI may include a list that is organized by channel number, where the channel number represents a channel from which the media content is recorded. In another embodiment, the first GUI and the second GUI may include a list that is organized by program identifier, by expiration date, by recording date, by title, by another parameter, or any combination thereof.

Figure 7:
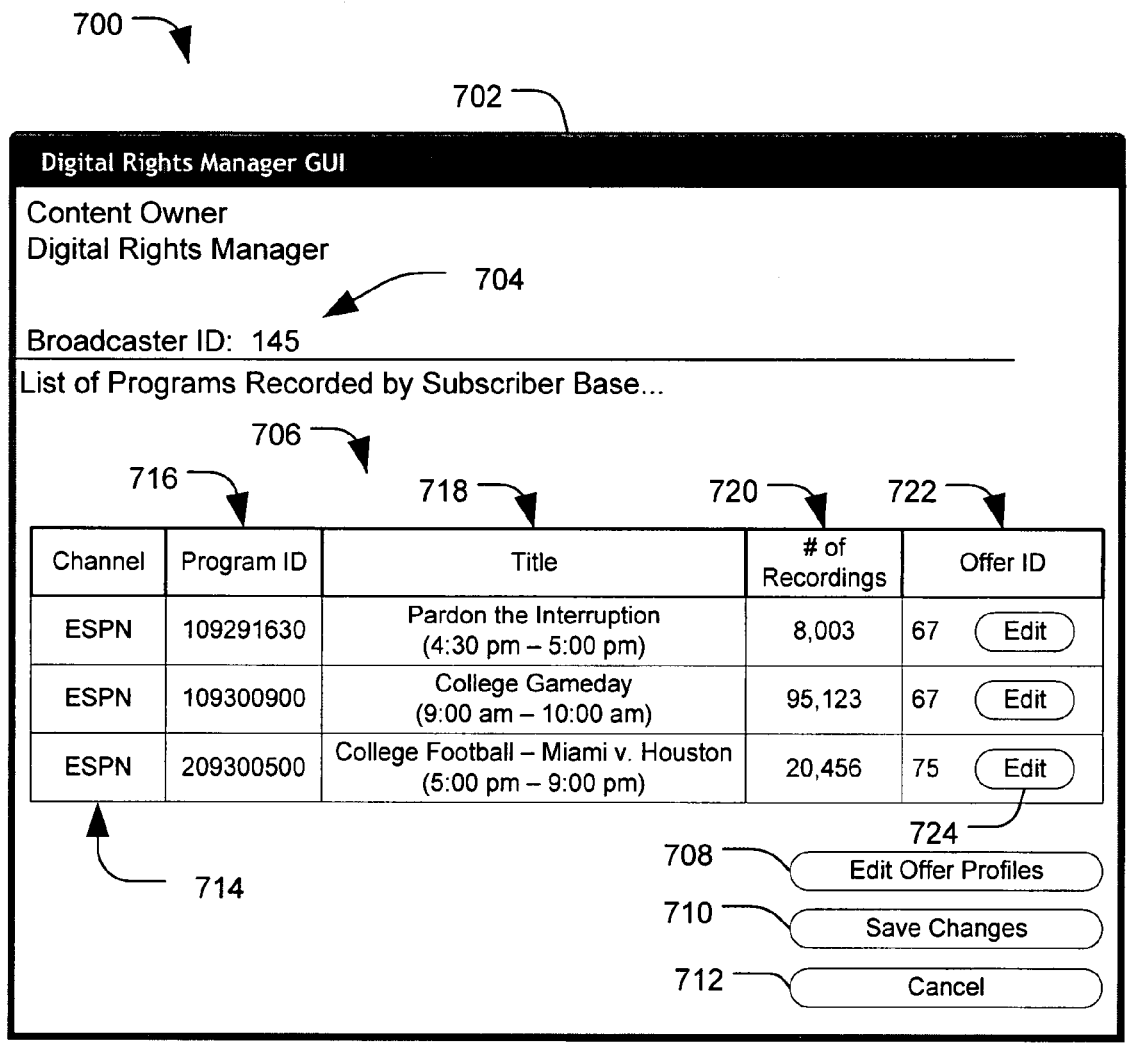
FIG. 7 is a first particular illustrative embodiment of a graphical user interface to manage digital rights.

FIG. 7 is a first particular illustrative embodiment of a graphical user interface (GUI) 700 to manage digital rights. The GUI 700 includes a window 702. The window 702 includes a broadcast identifier 704 and a list of programs 706 that were recorded by a subscriber base and that are associated with the particular broadcaster. In this instance, the broadcast identifier 704 ("145") is associated with ESPN, and the list of programs 706 includes programs that were recorded by one or more servers. The window 702 also includes user selectable elements, such as an "edit offer profiles" button 708, a "save changes" button 710, and a "cancel" button. Further, the list of programs 706 includes channels 714, program identifiers 716, titles 718, a number of recording 720 (the number of recordings within the network), and associated offer profile identifiers 722. Additionally, each item in the list may include a selectable indicator, such as the selectable "edit" button 724, which may be access to edit the particular offer profile associated with the program identifier "209300500."

The GUI 700 may be provided to a content source or content owner to configure digital access rights associated with a particular program. A user may access a GUI (such as a GUI 800 depicted in FIG. 8) to configure a digital access rights profile, which may then be associated with a particular program by selecting the "edit" button 724, for example.

Figure 8:
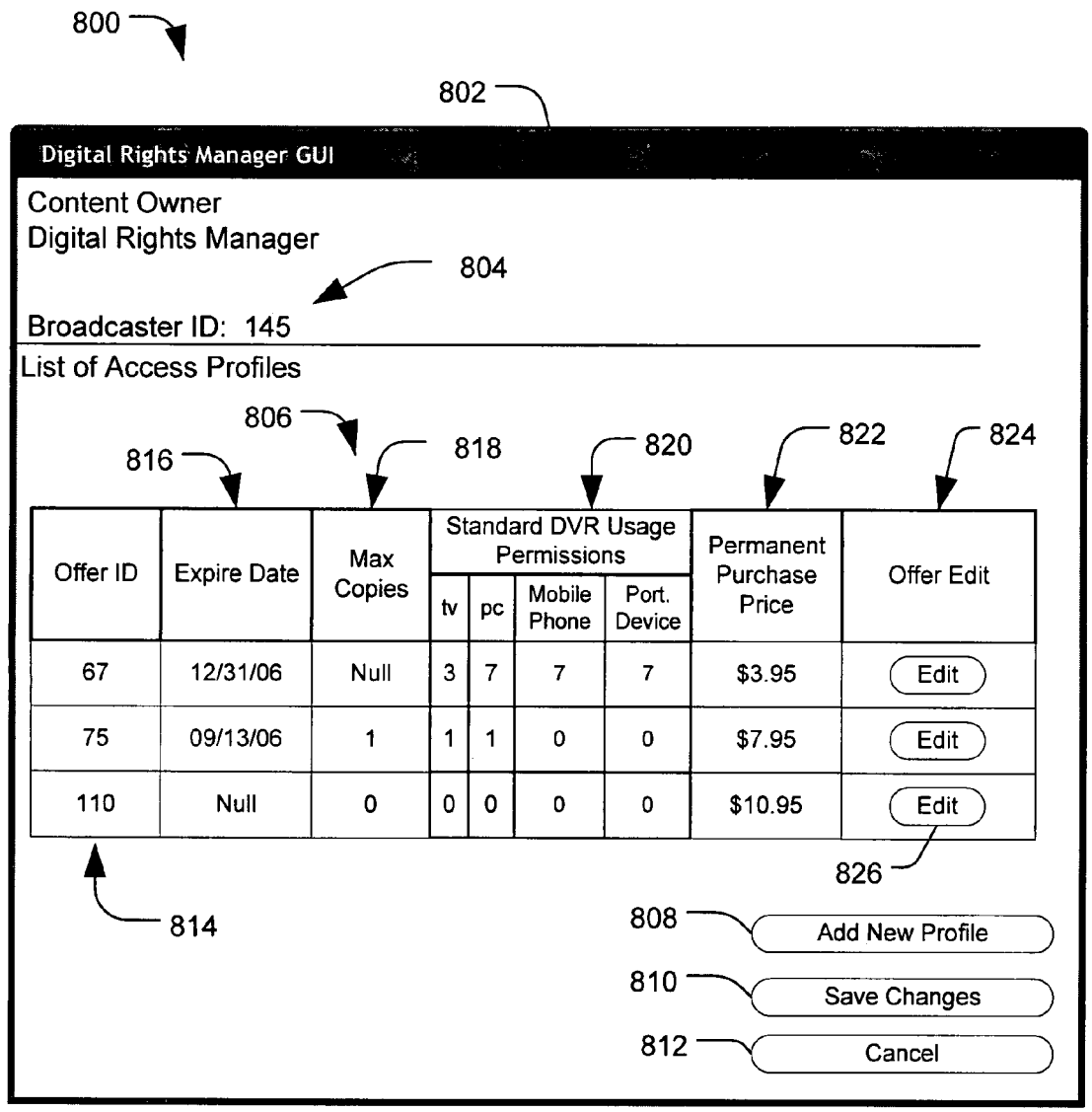
FIG. 8 is a second particular illustrative embodiment of a graphical user interface to manage digital rights.

FIG. 8 is a second particular illustrative embodiment of a graphical user interface (GUI) 800 to manage digital rights. The GUI 800 includes a window 802 that includes data related to a broadcaster 804, a list of access profiles 806 associated with the broadcaster, and selectable elements, such as an "add new access profiles" button 808, a "save changes" button 810 and a "cancel" button 812. The list 806 includes offer identifiers 814, expiration dates 816 associated with the offers, and a maximum number of copies 818 allowed for each offer profile. Further, the list of access profiles 806 include attributes related to standard DVR usage permissions 820, purchase price data 822, and offer editing options 824. The offer editing options 824 may include selectable elements, such as the "edit" button 826, which may be selected to edit the particular access profile.

In general, the list of access profiles 806 may include options related to each of the elements of the access profiles table 438 in FIG. 4. However, for clarity of discussion, some of the elements from the table are omitted from the list of access profiles 806. For example, Permanent Usage Permissions may also be shown in list of access profiles 806 within the GUI 800. Alternatively, such permissions may be accessible via the "edit" button 824.

Figure 9:
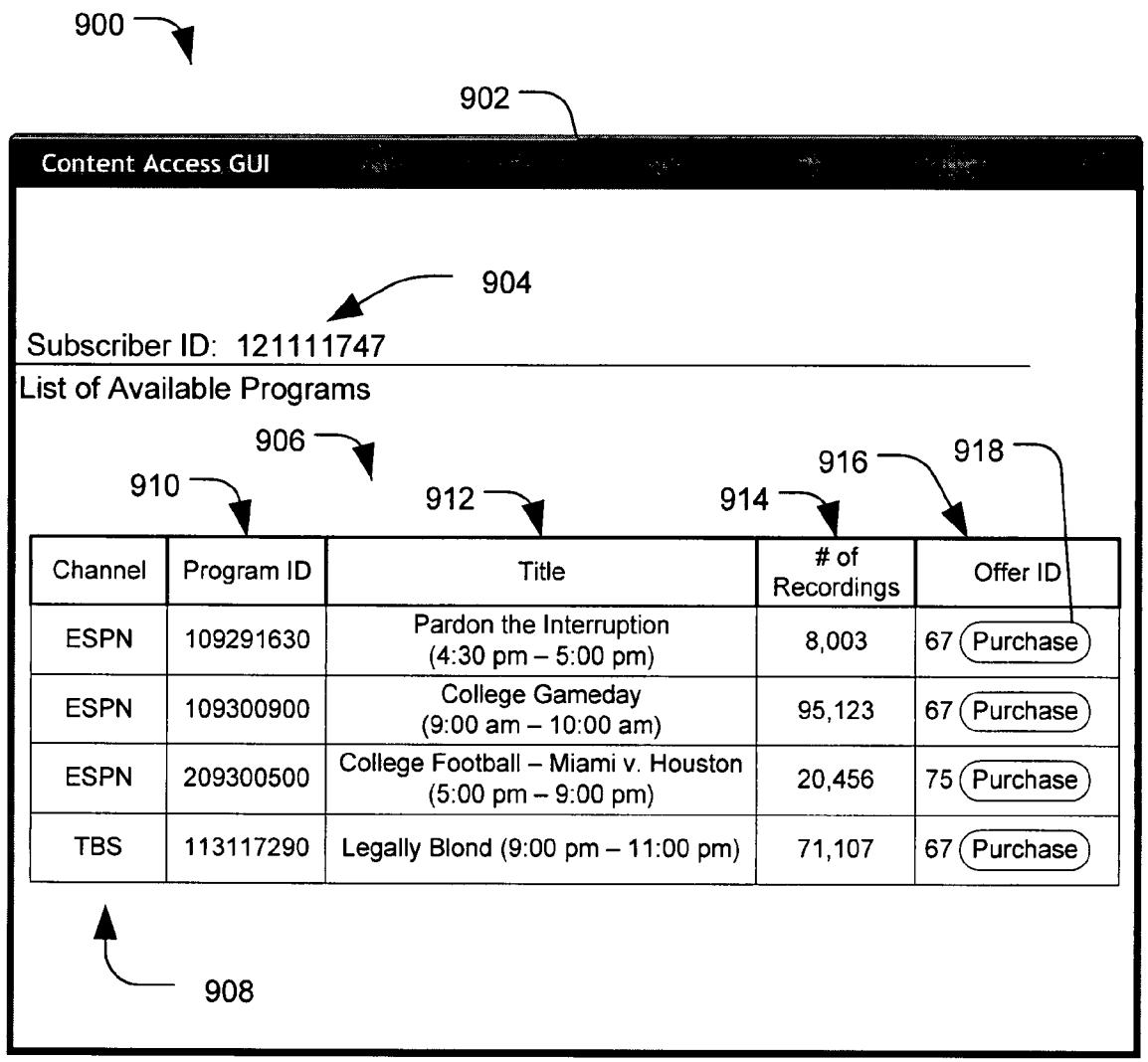
FIG. 9 is a third particular illustrative embodiment of a graphical user interface to access media content based on digital rights.

FIG. 9 is a third particular illustrative embodiment of a graphical user interface (GUI) 900 to purchase media content from the media content distribution service based on the digital rights access profile. The GUI 900 includes a window 902 that has a subscriber identifier 904 and a list of available media content 906. The list of available media content 906 includes channels 908, program identifiers 910, titles 912, a number of recordings 914, and offer identifiers 916. The offer identifiers column 916 also includes a user selectable element 918, which may be selected to purchase the associated media content. A user may select the user selectable element 918 to purchase a download of a recording of the program identified by the program identifier "109291630," based on the access profile associated with the program (i.e., offer profile number "67"). This interface depicts one sample embodiment of an offer site for subscribers; there may be other options for subscribers to click on the offer ID 918, for example, and see a detailed description of what digital rights are associated with that particular offer. In addition, there may be categories of content that make it easy for a subscriber to search a large media store, such as by program title, category, etc. It should be noted that the programs offered may not have necessarily been recorded by the subscriber. In a particular illustrative embodiment, content owners may wish to sell content that has been recorded and placed in the recorded media database 218, 244 by one or more subscribers. The interface may allow the content owner to create one or more sales offers for all subscribers based on such content.

In general, the offer profile or access profile may define particular limitations related to the selected media content, such as an expiration date, a number of copies, or other limitations, which may govern the purchaser's use of or access to the media content. A content source may utilize the graphical user interfaces 700 and 800 in FIGS. 7 and 8 to associate a particular access profile to particular media content. Subsequent purchase of the media content via the GUI 900 includes the access profile, defining the download or access permissions for the selected content.

Figure 10:
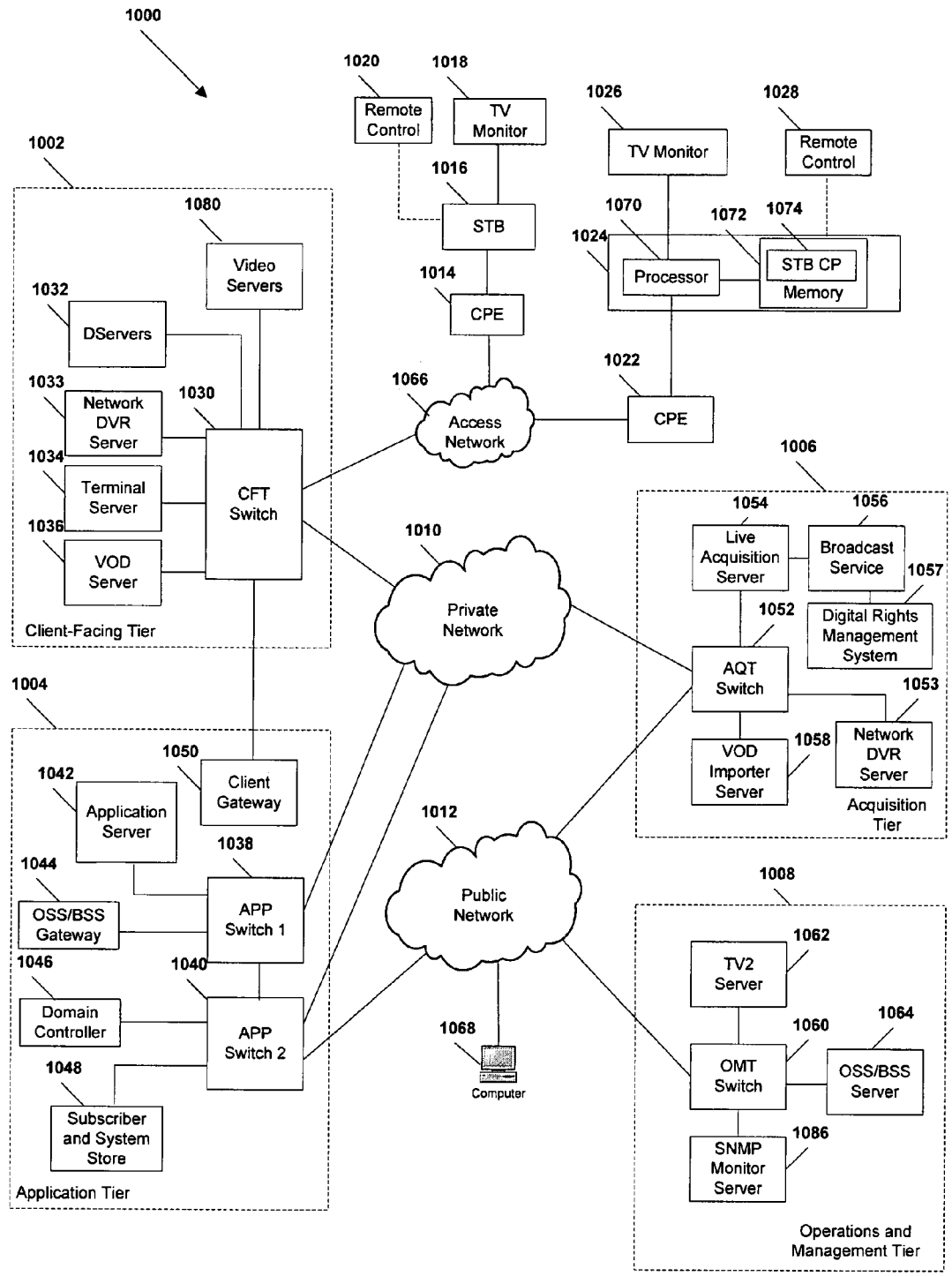
FIG. 10 is a block diagram of a fourth particular embodiment of a system to manage digital rights.

Referring to FIG. 10, an illustrative embodiment of an Internet Protocol Television (IPTV) system that includes a system to manage digital rights associated with stored media content is illustrated and is generally designated 1000. As shown, the system 1000 can include a client facing tier 1002, an application tier 1004, an acquisition tier 1006, and an operations and management tier 1008. Each tier 1002, 1004, 1006, 1008 is coupled to a private network 1010; to a public network 1012, such as the Internet; or to both the private network 1010 and the public network 1012. For example, the client-facing tier 1002 can be coupled to the private network 1010. Further, the application tier 1004 can be coupled to the private network 1010 and to the public network 1012. The acquisition tier 1006 can also be coupled to the private network 1010 and to the public network 1012. Additionally, the operations and management tier 1008 can be coupled to the public network 1012.

As illustrated in FIG. 10, the various tiers 1002, 1004, 1006, 1007 communicate with each other via the private network 1010 and the public network 1012. For instance, the client-facing tier 1002 can communicate with the application tier 1004 and the acquisition tier 1006 via the private network 1010. The application tier 1004 can communicate with the acquisition tier 1006 via the private network 1010. Further, the application tier 1004 can communicate with the acquisition tier 1006 and the operations and management tier 1008 via the public network 1012. Moreover, the acquisition tier 1006 can communicate with the operations and management tier 1008 via the public network 1012. In a particular embodiment, elements of the application tier 1004, including, but not limited to, a client gateway 1050, can communicate directly with the client-facing tier 1002.

The client-facing tier 1002 can communicate with user equipment via an access network 1066, such as an Internet Protocol Television (IPTV) access network. In an illustrative embodiment, customer premises equipment (CPE) 1014, 1022 can be coupled to a local switch, router, or other device of the access network 1066. The client-facing tier 1002 can communicate with a first representative set-top box device 1016 via the first CPE 1014 and with a second representative set-top box device 1024 via the second CPE 1022. In a particular embodiment, the first representative set-top box device 1016 and the first CPE 1014 can be located at a first customer premise, and the second representative set-top box device 1024 and the second CPE 1022 can be located at a second customer premise. In another particular embodiment, the first representative set-top box device 1016 and the second representative set-top box device 1024 can be located at a single customer premise, both coupled to one of the CPE 1014, 1022. The CPE 1014, 1022 can include routers, local area network devices, modems, such as digital subscriber line (DSL) modems, any other suitable devices for facilitating communication between a set-top box device and the access network 1066, or any combination thereof.

In an exemplary embodiment, the client-facing tier 1002 can be coupled to the CPE 1014, 1022 via fiber optic cables. In another exemplary embodiment, the CPE 1014, 1022 can be digital subscriber line (DSL) modems that are coupled to one or more network nodes via twisted pairs, and the client-facing tier 1002 can be coupled to the network nodes via fiber-optic cables. Each set-top box device 1016, 1024 can process data received via the access network 1066, via an IPTV software platform, such as Microsoft® TV IPTV Edition.

The first set-top box device 1016 can be coupled to a first external display device, such as a first television monitor 1018, and the second set-top box device 1024 can be coupled to a second external display device, such as a second television monitor 1026. Moreover, the first set-top box device 1016 can communicate with a first remote control 1020, and the second set-top box device 1024 can communicate with a second remote control 1028. The set-top box devices 1016, 1024 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof. Additionally, each set-top box device 1016, 1024 may be coupled to more than one external display device. Additionally, each set-top box device may communicate with more than one remote control device.

In an exemplary, non-limiting embodiment, each set-top box device 1016, 1024 can receive data, video, or any combination thereof, from the client-facing tier 1002 via the access network 1066 and render or display the data, video, or any combination thereof, at the display device 1018, 1026 to which it is coupled. Each set-top box 1016, 1024 may also send commands or other information to other devices of the IPTV system via the access network 1066. In an illustrative embodiment, the set-top box devices 1016, 1024 can include tuners that receive and decode television programming signals or packet streams for transmission to the display devices 1018, 1026. Further, the set-top box devices 1016, 1024 can include a STB processor 1070 and a STB memory device 1072 that is accessible to the STB processor 1070. In one embodiment, a computer program, such as the STB computer program 1074, can be embedded within the STB memory device 1072.

In an illustrative embodiment, the client-facing tier 1002 can include a client-facing tier (CFT) switch 1030 that manages communication between the client-facing tier 1002 and the access network 1066 and between the client-facing tier 1002 and the private network 1010. As illustrated, the CFT switch 1030 is coupled to one or more data servers, such as D-servers 1032, that store, format, encode, replicate, or otherwise manipulate or prepare video content for communication from the client-facing tier 1002 to the set-top box devices 1016, 1024. The CFT switch 1030 can also be coupled to a terminal server 1034 that provides terminal devices with a connection point to the private network 1010. In a particular embodiment, the CFT switch 1030 can be coupled to a video-on-demand (VOD) server 1036 that stores or provides VOD content imported by the IPTV system 1000. Further, the CFT switch 1030 is coupled to one or more video servers 1080 that receive video content and transmit the content to the set-top boxes 1016, 1024 via the access network 1066. In a particular embodiment, the CFT switch 1030 may be coupled to a network DVR server 1033, such as the network DVR server depicted in FIGS. 1 and 2.

In an illustrative embodiment, the client-facing tier 1002 can communicate with a large number of set-top boxes, such as the representative set-top boxes 1016, 1024 over a wide geographic area, such as a metropolitan area, a viewing area, a statewide area, a regional area, a nationwide area or any other suitable geographic area, market area, or subscriber or customer group that can be supported by networking the client-facing tier 1002 to numerous set-top box devices. In a particular embodiment, the CFT switch 1030, or any portion thereof, can include a multicast router or switch that communicates with multiple set-top box devices via a multicast-enabled network.

As illustrated in FIG. 10, the application tier 1004 can communicate with both the private network 1010 and the public network 1012. The application tier 1004 can include a first application tier (APP) switch 1038 and a second APP switch 1040. In a particular embodiment, the first APP switch 1038 can be coupled to the second APP switch 1040. The first APP switch 1038 can be coupled to an application server 1042 and to an OSS/BSS gateway 1044. In a particular embodiment, the application server 1042 can provide applications to the set-top box devices 1016, 1024 via the access network 1066, which enable the set-top box devices 1016, 1024 to provide functions, such as interactive program guides, video gaming, display, messaging, processing of VOD material and other IPTV content, etc. In an illustrative embodiment, the application server 1042 can provide location information to the set-top box devices 1016, 1024. In a particular embodiment, the OSS/BSS gateway 1044 includes operation systems and support (OSS) data, as well as billing systems and support (BSS) data. In one embodiment, the OSS/BSS gateway 1044 can provide or restrict access to an OSS/BSS server 1064 that stores operations and billing systems data.

The second APP switch 1040 can be coupled to a domain controller 1046 that provides Internet access, for example, to users at their computers 1068 via the public network 1012. For example, the domain controller 1046 can provide remote Internet access to IPTV account information, e-mail, personalized Internet services, or other online services via the public network 1012. In addition, the second APP switch 1040 can be coupled to a subscriber and system store 1048 that includes account information, such as account information that is associated with users who access the IPTV system 1000 via the private network 1010 or the public network 1012. In an illustrative embodiment, the subscriber and system store 1048 can store subscriber or customer data and create subscriber or customer profiles that are associated with IP addresses, stock-keeping unit (SKU) numbers, other identifiers, or any combination thereof, of corresponding set-top box devices 1016, 1024. In another illustrative embodiment, the subscriber and system store 1048 can store data associated with capabilities of set-top box devices 1016, 1024 associated with particular customers.

In a particular embodiment, the application tier 1004 can include a client gateway 1050 that communicates data directly to the client-facing tier 1002. In this embodiment, the client gateway 1050 can be coupled directly to the CFT switch 1030. The client gateway 1050 can provide user access to the private network 1010 and the tiers coupled thereto. In an illustrative embodiment, the set-top box devices 1016, 1024 can access the IPTV system 1000 via the access network 1066, using information received from the client gateway 1050. User devices can access the client gateway 1050 via the access network 1066, and the client gateway 1050 can allow such devices to access the private network 1010 once the devices are authenticated or verified. Similarly, the client gateway 1050 can prevent unauthorized devices, such as hacker computers or stolen set-top box devices from accessing the private network 1010, by denying access to these devices beyond the access network 1066.

For example, when the first representative set-top box device 1016 accesses the client-facing tier 1002 via the access network 1066, the client gateway 1050 can verify subscriber information by communicating with the subscriber and system store 1048 via the private network 1010. Further, the client gateway 1050 can verify billing information and status by communicating with the OSS/BSS gateway 1044 via the private network 1010. In one embodiment, the OSS/BSS gateway 1044 can transmit a query via the public network 1012 to the OSS/BSS server 1064. After the client gateway 1050 confirms subscriber and/or billing information, the client gateway 1050 can allow the set-top box device 1016 to access IPTV content and VOD content at the client-facing tier 1002. If the client gateway 1050 cannot verify subscriber information for the set-top box device 1016, e.g., because it is connected to an unauthorized twisted pair, the client gateway 1050 can block transmissions to and from the set-top box device 1016 beyond the access network 1066.

As indicated in FIG. 10, the acquisition tier 1006 includes an acquisition tier (AQT) switch 1052 that communicates with the private network 1010. The AQT switch 1052 can also communicate with the operations and management tier 1008 via the public network 1012. In a particular embodiment, the AQT switch 1052 can be coupled to a live acquisition server 1054 that receives or acquires television content, movie content, advertisement content, other video content, or any combination thereof, from a broadcast service 1056, such as a satellite acquisition system or satellite head-end office. In a particular embodiment, the live acquisition server 1054 can transmit content to the AQT switch 1052, and the AQT switch 1052 can transmit the content to the CFT switch 1030 via the private network 1010. In a particular embodiment, the AQT switch 1052 may be coupled to a network DVR server 1053, such as the network DVR server depicted in FIGS. 1-3. Additionally, the acquisition tier 1006 includes a digital rights management system 1057 that determine a list of available media content stored within the system 1000, such as at the network DVR server 1033. The digital rights management system 1057 can generate a graphical user interface accessible by a content source, such as a broadcast service, a content source, content provider, Copyright owner, or any combination thereof. The GUI may be accessed by the content source to configure digital rights access profiles for such stored DVR content to allow the stored DVR content to be reused as video on demand content according to an associated access profile.

In an illustrative embodiment, content can be transmitted to the D-servers 1032, where it can be encoded, formatted, stored, replicated, or otherwise manipulated and prepared for communication from the video server(s) 1080 to the set-top box devices 1016, 1024. The CFT switch 1030 can receive content from the video server(s) 1080 and communicate the content to the CPE 1014, 1022 via the access network 1066. The set-top box devices 1016, 1024 can receive the content via the CPE 1014, 1022, and can transmit the content to the television monitors 1018, 1026. In an illustrative embodiment, video or audio portions of the content can be streamed to the set-top box devices 1016, 1024.

In an illustrative embodiment, content can be transmitted to the network DVR server 1033, where it can be encoded, formatted, stored, replicated, or otherwise manipulated and prepared for retention in a program database. The network DVR 1033 may also notify a master recording table at the digital rights management system 1057.

Further, the AQT switch 1052 can be coupled to a video-on-demand importer server 1058 that receives and stores television or movie content received at the acquisition tier 1006 and communicates the stored content to the VOD server 1036 at the client-facing tier 1002 via the private network 1010. Additionally, at the acquisition tier 1006, the video-on-demand (VOD) importer server 1058 can receive content from one or more VOD sources outside the IPTV system 1000, such as movie studios and programmers of non-live content. The VOD importer server 1058 can transmit the VOD content to the AQT switch 1052, and the AQT switch 1052, in turn, can communicate the material to the CFT switch 1030 via the private network 1010. The VOD content can be stored at one or more servers, such as the VOD server 1036.

When users issue requests for VOD content via the set-top box devices 1016, 1024, the requests can be transmitted over the access network 1066 to the VOD server 1036, via the CFT switch 1030. Upon receiving such requests, the VOD server 1036 can retrieve the requested VOD content and transmit the content to the set-top box devices 1016,724 across the access network 1066, via the CFT switch 1030. The set-top box devices 1016, 1024 can transmit the VOD content to the television monitors 1018, 1026. In an illustrative embodiment, video or audio portions of VOD content can be streamed to the set-top box devices 1016, 1024.

FIG. 10 further illustrates that the operations and management tier 1008 can include an operations and management tier (OMT) switch 1060 that conducts communication between the operations and management tier 1008 and the public network 1012. In the embodiment illustrated by FIG. 10, the OMT switch 1060 is coupled to a TV2 server 1062. Additionally, the OMT switch 1060 can be coupled to an OSS/BSS server 1064 and to a simple network management protocol (SNMP) monitor server 1086 that monitors network devices within or coupled to the IPTV system 1000. In a particular embodiment, the OMT switch 1060 can communicate with the AQT switch 1052 via the public network 1012.

In an illustrative embodiment, the live acquisition server 1054 can transmit content to the AQT switch 1052, and the AQT switch 1052, in turn, can transmit the content to the OMT switch 1060 via the public network 1012. In this embodiment, the OMT switch 1060 can transmit the content to the TV2 server 1062 for display to users accessing the user interface at the TV2 server 1062. For example, a user can access the TV2 server 1062 using a personal computer 1068 coupled to the public network 1012.

In an illustrative embodiment, a user may schedule digital video recording (DVR) of particular programs via customer premises equipment, such as the first representative STB device 1016 using the remote control 1020. The first representative STB device 1016 may communicate the request to the network DVR server 1033 via the CPE 1014, the access network 1066, and the CFT switch 1030. The network DVR 1033 may create a record associating the user with the recorded program. The network DVR 1033 may also indicate a number of requests associated with the program.

In an illustrative embodiment, a user associated with a content source, such as a broadcast television provider, can access the digital rights management system 1057, which provides a graphical user interface (GUI), such as a window for display within an Internet browser application. The GUI includes a list of media content items associated with the content source that were recorded by one or more users of the system via the network DVR server 1033. In a particular illustrative embodiment, the digital rights management system 1057 does not include media content items that were recorded from other content sources within the GUI. The GUI may also include one or more selectable indicators accessible by the user to configure digital rights associated with the media content. The digital rights management system 1057 can generate a second user interface for video on demand distribution of the media content based on the configured digital rights. In a particular illustrative example, the digital rights may include a number of times the media content may be downloaded or viewed by a particular user, a pricing structure, an expiration date, other information, or any combination thereof.

In conjunction with the configuration of structure described herein, the systems, methods, and associated graphical user interfaces (GUIs) disclosed include a digital content distribution system adapted to identify media content associated with a particular content source and to generate a graphical user interface (GUI) accessible to a content source to configure digital rights associated with network DVR content stored at one or more servers. The systems and methods make it possible for a content source to configure digital access rights in already recorded media content so that the media content may be reused as video on demand media content. The systems and methods disclosed herein allow the media content to be offered to users for download via a public network according to the access profiles defined by the content source. The systems and methods may include transaction processing systems to compensate the copyright owner for sales related to such media content.

Figure 11:
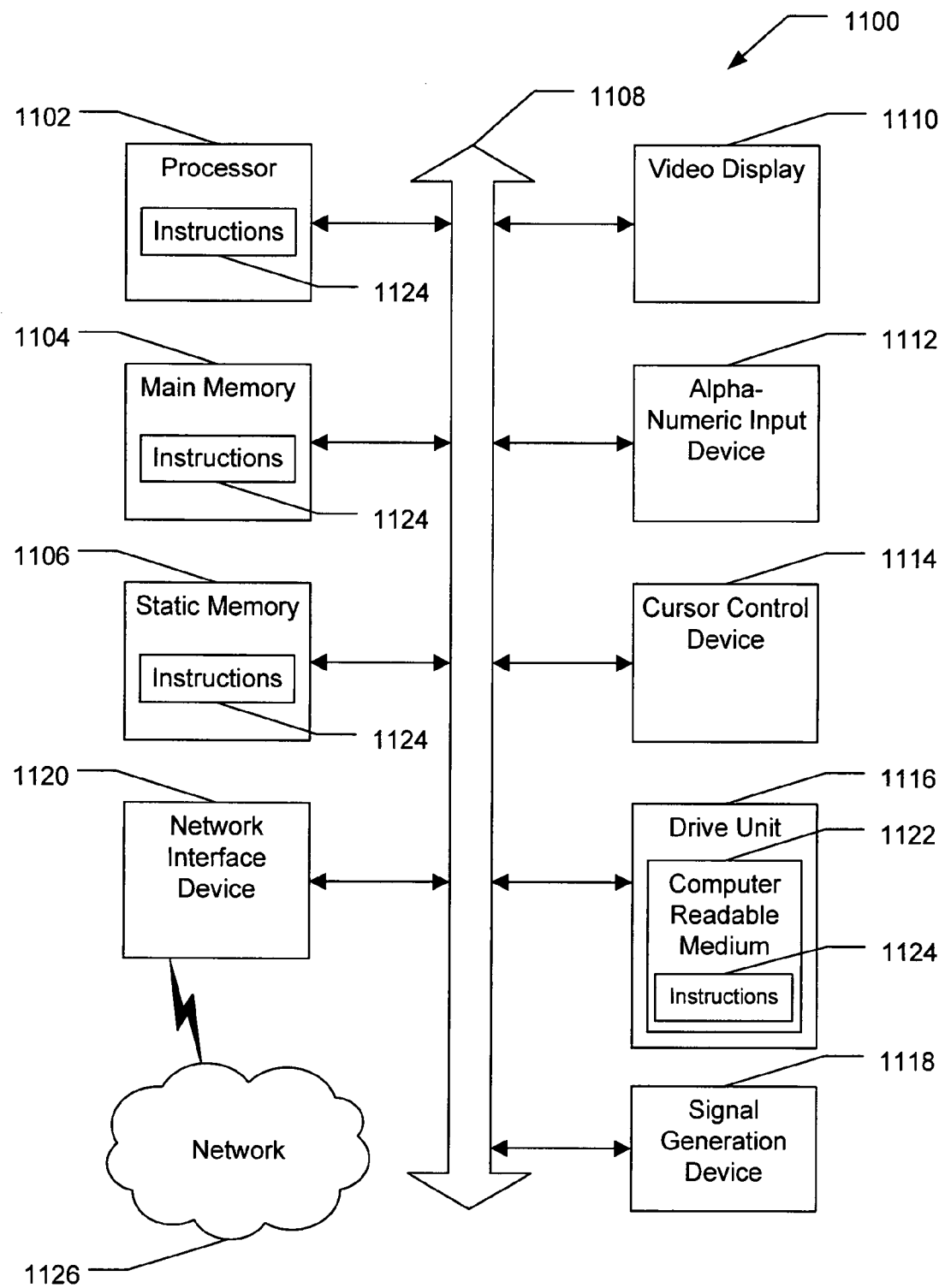
FIG. 11 is a block diagram of a particular illustrative embodiment of a general computing system.

Referring to FIG. 11, an illustrative embodiment of a general computer system is shown and is designated 1100. The computer system 1100 can include a set of instructions that can be executed to cause the computer system 1100 to perform any one or more of the methods or computer based functions disclosed herein. The computer system 1100 may operate as a standalone device or may be connected, e.g., using a network, to other computer systems or peripheral devices, such as a VHE, SVHE, CPE, set-top box device, or other server or user device, as illustrated in FIGS. 1-3 and FIG. 10.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a processor 1102, e.g., a central processing unit (CPU), a graphics processing unit (GPU), or both. Moreover, the computer system 1100 can include a main memory 1104 and a static memory 1106, that can communicate with each other via a bus 1108. As shown, the computer system 1100 may further include a video display unit 1110, such as a liquid crystal display (LCD), an organic light emitting diode (OLED), a flat panel display, a solid state display, or a cathode ray tube (CRT). Additionally, the computer system 1100 may include an input device 1112, such as a keyboard, and a cursor control device 1114, such as a mouse. The computer system 1100 can also include a disk drive unit 1116, a signal generation device 1118, such as a speaker or remote control, and a network interface device 1120.

In a particular embodiment, as depicted in FIG. 11, the disk drive unit 1116 may include a computer-readable medium 1122 in which one or more sets of instructions 1124, e.g. software, can be embedded. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1124 or receives and executes instructions 1124 responsive to a propagated signal, so that a device connected to a network 1126 can communicate voice, video or data over the network 1126. Further, the instructions 1124 may be transmitted or received over the network 1126 via the network interface device 1120.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A computerized method of managing digital rights, the method comprising:
receiving, at a video head end (VHE) server that is part of a multimedia content distribution service, a request to record media content that is associated with a content source;
recording the media content at the VHE server in response to the request to record the media content;
determining a number of requests to record the media content received at the VHE server;
sending a recording request to a super video head end (SVHE) to record the media content in response to determining that the number of requests equals or exceeds a threshold, wherein the SVHE records the media content after receiving the recording request;
providing a graphical user interface (GUI) accessible to a content manager at the content source, the GUI including:
a list of the recorded media content, at least one selectable element associated with each item of the list accessible to select media content and to configure digital rights associated with the selected media content, the list of the recorded media content including information relating to whether a particular recorded media content item is stored at the VHE server or is stored at the SVHE;
a number of recordings associated with each item of the list, wherein the number of recordings indicates how many recordings were made of a particular item of the list; and
a selectable indicator to configure at least one offer profile;
receiving data that associates the at least one offer profile with the selected media content;
providing an interface to multiple set top box devices for purchase of the selected media content by subscribers based on the at least one offer profile;
receiving, from at least one set top box device of the multiple set top box devices, a purchase request to purchase the selected media content; and
sending the selected media content from one of the VHE server and the SVHE to the at least one set top box device in response to processing the purchase request.

2. The method of claim 1, where the recorded media content is obtained from a broadcast television source.

3. The method of claim 1, wherein the request to record the media content is received from a subscriber.

4. The method of claim 1, further comprising:
identifying, at the VHE server, second recorded media content that is associated with a second content source; and
providing a second graphical user interface (GUI) accessible to a second content manager at a second content source, the second GUI including data related to the second recorded media content and including a selectable option to manage digital rights associated with each item of the second recorded media content.

5. The method of claim 1, wherein the digital rights include digital video recording (DVR) usage permissions and include Video on Demand purchase permissions.

6. The method of claim 1, wherein the at least one offer profile comprises an expiration date for access or download of media content.

7. The method of claim 6, wherein the interface comprises an electronic program guide accessible via the multiple set top box devices.

8. The method of claim 6, wherein the interface comprises an Internet web page interface.

9. The method of claim 6, wherein the interface comprises a custom software application written in Java 2 Micro Edition (J2ME) for portable devices.

10. A system to manage digital rights, the system comprising:
processing logic and non-transitory memory accessible to the processing logic supporting a multimedia content distribution service configured to transmit multimedia data to multiple set top box devices, the memory comprising instructions executable by the processing logic to:
record media content at the memory in response to receiving a request to record the media content;
determine a number of requests to record the media content at the memory, wherein the media content is associated with a content source;
send a record request to a super video head end (SVHE) to record the media content when the number of requests equals or exceeds a threshold, wherein the SVHE records the media content after receiving the record request;

provide a graphical user interface (GUI) accessible to a content manager at the content source, the GUI including:
- a list of the recorded media content, wherein the list of the recorded media content includes information relating to whether a particular recorded media content item is stored at the memory or is stored at the SVHE;
- at least one selectable element associated with each item of the list accessible to select media content and to configure digital rights associated with the selected media content to enable purchase of the selected media content; and
- a selectable indicator to configure at least one offer profile;

receive data related to the selected media content to associate the at least one offer profile with the selected media content;

provide an interface to the multiple set top box devices for purchase of the selected media content by subscribers based on the at least one offer profile;

receive a purchase request to purchase the selected media content from at least one set top box device of the multiple set top box devices; and send the selected media content to the at least one set top box device in response to processing the purchase request.

11. The system of claim 10, further comprising instructions executable by the processing logic to generate an interface for downloading the selected media content on demand by the subscribers to the multimedia content distribution service based on the digital rights.

12. The system of claim 10, wherein the memory comprises one or more servers to store the recorded media content.

13. The system of claim 10, wherein the digital rights comprise at least one of a time limit to view the media content, a restriction on a number of times a subscriber may receive the media content, and a restriction on a number of devices and a type of format to which the subscriber may transfer the media content.

14. The system of claim 10, wherein the content manager comprises an authorized user from at least one of the content provider, a television network company, a video production company, a video distribution company, a music production company, a music distribution company, a software production company, an interactive games production company, and a television programming distributor.

15. A processor-readable non-transitory medium embodying instructions stored at a super video head end (SVHE) that are executable by a processor of the SVHE to:
- record media content at one or more servers supporting a multimedia content distribution service, the one or more servers configured to transmit multimedia data to multiple set-top box devices;
- determine recorded media content at the one or more servers that is associated with a content source;
- provide a graphical user interface (GUI) accessible to a content manager at the content source, the GUI including:
  - a list of the recorded media content,
  - at least one selectable element associated with each item of the list accessible to select media content, the at least one selectable element to configure digital rights associated with the selected media content such that recorded media content that was once unavailable may be made available for purchase;
  - a number of recordings associated with each item of the list, wherein the number of recordings indicates how many recordings were made of a particular item of the list
  - a selectable indicator to configure an offer profile;
- receive data related to the selected media content to associate the offer profile with the selected media content;
- provide an interface to the multiple set top box devices for purchase of the selected media content by subscribers based on the offer profile;
- receive a purchase request to purchase the selected media content from at least one set top box device of the multiple set top box devices; and
- send the selected media content from the SVHE to the at least one set top box device in response to processing the purchase request.

16. The processor-readable non-transitory medium of claim 15, wherein the offer profile includes digital rights data.

17. The processor-readable non-transitory medium of claim 16, further comprising instructions stored at the SVHE that are executable by the processor of the SVHE to associate the digital rights data with the selected media content.

* * * * *